(12) United States Patent
Yamashita et al.

(10) Patent No.: US 9,062,734 B2
(45) Date of Patent: Jun. 23, 2015

(54) SHOCK ABSORBER AND VEHICLE USING THE SAME

(71) Applicants: Mikio Yamashita, Yokohama (JP); Atsushi Maeda, Fujiawa (JP)

(72) Inventors: Mikio Yamashita, Yokohama (JP); Atsushi Maeda, Fujiawa (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 109 days.

(21) Appl. No.: 13/775,454

(22) Filed: Feb. 25, 2013

(65) Prior Publication Data
US 2014/0238796 A1    Aug. 28, 2014

(51) Int. Cl.
| F16F 11/00 | (2006.01) |
| F16F 7/09 | (2006.01) |
| F16F 9/512 | (2006.01) |

(52) U.S. Cl.
CPC ............... *F16F 7/09* (2013.01); *F16F 9/5126* (2013.01)

(58) Field of Classification Search
USPC .................. 188/271, 266.4, 280; 267/134
See application file for complete search history.

(56) References Cited

U.S. PATENT DOCUMENTS

| 4,166,523 | A | * | 9/1979 | Fujii et al. ................. 188/322.17 |
| 4,588,054 | A | * | 5/1986 | LeBaron ........................ 188/280 |
| 4,643,437 | A | * | 2/1987 | Salant et al. ................... 277/319 |
| 4,989,701 | A | * | 2/1991 | Yamaoka et al. ......... 188/322.17 |
| 5,246,235 | A | * | 9/1993 | Heinzen ......................... 277/321 |
| 5,257,680 | A | * | 11/1993 | Corcoran et al. .............. 188/129 |
| 5,277,281 | A | * | 1/1994 | Carlson et al. ................. 188/267 |
| 5,560,456 | A | * | 10/1996 | Koch et al. ..................... 188/300 |
| 6,003,872 | A | * | 12/1999 | Nord .............................. 277/317 |
| 6,053,291 | A | * | 4/2000 | Shibahata et al. ............. 188/271 |
| 6,279,765 | B1 | * | 8/2001 | Monaco ........................... 213/22 |
| 6,290,038 | B1 | * | 9/2001 | Jensen et al. .................. 188/381 |
| 6,318,521 | B1 | * | 11/2001 | Niaura et al. ............... 188/267.1 |
| 6,340,080 | B1 | * | 1/2002 | Carlson ....................... 188/267.2 |
| 6,547,046 | B2 | * | 4/2003 | Yamaguchi et al. ...... 188/322.17 |
| 6,749,048 | B2 | * | 6/2004 | Coombs .................... 188/322.17 |
| 6,968,930 | B2 | * | 11/2005 | Shibao ....................... 188/322.17 |
| 7,147,216 | B2 | * | 12/2006 | Gassner et al. ............... 267/201 |
| 7,413,063 | B1 | * | 8/2008 | Davis .......................... 188/267.1 |

(Continued)

FOREIGN PATENT DOCUMENTS

| JP | U-A-07-019642 | 4/1995 |
| JP | 2003-156093 | 5/2003 |

(Continued)

*Primary Examiner* — Robert A Siconolfi
*Assistant Examiner* — James Hsiao
(74) *Attorney, Agent, or Firm* — Nixon & Vanderhye P.C.

(57) ABSTRACT

A shock absorber includes a first and a second passage configured to flow a working fluid out of one chamber by movement of a piston, a first damping force generation mechanism installed at the first passage and configured to generate a damping force, a housing having at least a partial passage of the second passage formed therein, a free piston movably installed in the housing and configured to partition the second passage into an upstream side and a downstream side, and a spring member disposed in the housing and configured to hole the free piston at a neutral position, wherein a second damping force generation mechanism including a friction member installed at an inner side of the cylinder with respect to the sealing member and constituted by an annular elastic rubber section in sliding contact with the piston rod and an annular base section to which the elastic rubber section is fixed and a communication passage configured to reduce a pressure difference between both sides in an axial direction of the friction member is provided.

15 Claims, 12 Drawing Sheets

(56) References Cited

U.S. PATENT DOCUMENTS

| | | | |
|---|---|---|---|
| 7,549,519 B2 * | 6/2009 | Atwater et al. | 188/381 |
| 7,793,584 B2 * | 9/2010 | Murakami et al. | 92/168 |
| 8,348,028 B2 * | 1/2013 | Zimmer et al. | 188/288 |
| 8,561,768 B2 * | 10/2013 | Moravy | 188/322.16 |
| 8,794,401 B2 * | 8/2014 | Sakai | 188/266.7 |
| 2009/0223758 A1 * | 9/2009 | Sakai | 188/267 |
| 2011/0214955 A1 * | 9/2011 | Maeda et al. | 188/280 |
| 2012/0312648 A1 * | 12/2012 | Yu et al. | 188/280 |

FOREIGN PATENT DOCUMENTS

| | | |
|---|---|---|
| JP | 2005-325997 | 11/2005 |
| JP | 2011-202800 | 10/2011 |

* cited by examiner

SHOCK ABSORBER AND VEHICLE USING THE SAME

BACKGROUND OF THE INVENTION

1. Field of the Invention

The present invention relates to a shock absorber and a vehicle using the same.

2. Description of Related Art

Among shock absorbers, there are shock absorbers which have a damping force varying mechanism configured to vary damping force properties in response to a vibration state (for example, see Japanese Unexamined Patent Application, First Publication No. 2011-202800). Also, there are shock absorbers which have a friction member configured to generate a frictional resistance with respect to a moving piston rod, separately from a sealing member configured to prevent leakage of a working fluid (for example, see Japanese Unexamined Patent Application, First Publication No. 2005-325997, Japanese Unexamined Patent Application, First Publication No. 2003-156093).

In the shock absorber, it is desirable to obtain good damping force properties.

SUMMARY OF THE INVENTION

The present invention provides a shock absorber and a vehicle using the same that are capable of obtaining good damping force properties.

According to a first aspect of the present invention, a shock absorber includes a sealing member configured to come in sliding contact with a piston rod and prevent leakage of a working fluid to the outside of a cylinder; a first passage and a second passage configured to flow the working fluid out of one chamber in the cylinder by movement of a piston; a first damping force generation mechanism installed at the first passage and configured to generate a damping force; a housing having at least a partial passage of the second passage formed therein; a free piston movably installed in the housing and configured to partition the second passage into an upstream side and a downstream side; and a spring member disposed in the housing and configured to hold the free piston at a neutral position, wherein the shock absorber has a second damping force generation mechanism including: a friction member installed at an inner side of the cylinder with respect to the sealing member and constituted by an annular elastic rubber section in sliding contact with the piston rod and an annular base section to which the elastic rubber section is fixed; and a communication passage configured to reduce a pressure difference between both sides in an axial direction of the friction member.

According to a second aspect of the present invention, the base section may be constituted by a bored disk type bottom section and a tube section extending from an outer circumferential side of the bottom section in the axial direction. The elastic rubber section may be provided with a minimum inner diameter section and a diameter expanding section of both sides in the axial direction of the minimum inner diameter section formed at an inner circumferential side of the elastic rubber section, tube section adhering surface fixed to the tube section formed at an outer circumferential side of the elastic rubber section, and a cutout section at least partially formed at the tube section side of an open surface at an opposite side of a bottom section adhering surface fixed to the bottom section in the axial direction. A deepest section of the cutout section may be shallower than a position in the axial direction of the minimum inner diameter section.

According to a third aspect of the present invention, in the shock absorber, a maximum damping force value at an excitation speed of 0.05 m/s may be lower at a frequency of 10 Hz or more than at a frequency of 1 Hz or less, and may be higher than at a frequency of about 5 Hz.

According to a fourth aspect of the present invention, in a vehicle, the shock absorber is used in a vehicle body including run flat tires.

According to a fifth aspect of the present invention, in a vehicle, the shock absorber is used in a vehicle body including tires having a pneumatic pressure of 240 kPa or more.

According to the shock absorber and the vehicle, good damping force properties can be obtained.

DETAILED DESCRIPTION OF THE INVENTION

A shock absorber according to an embodiment of the present invention will be described below with reference to the accompanying drawings.

Figure 1:
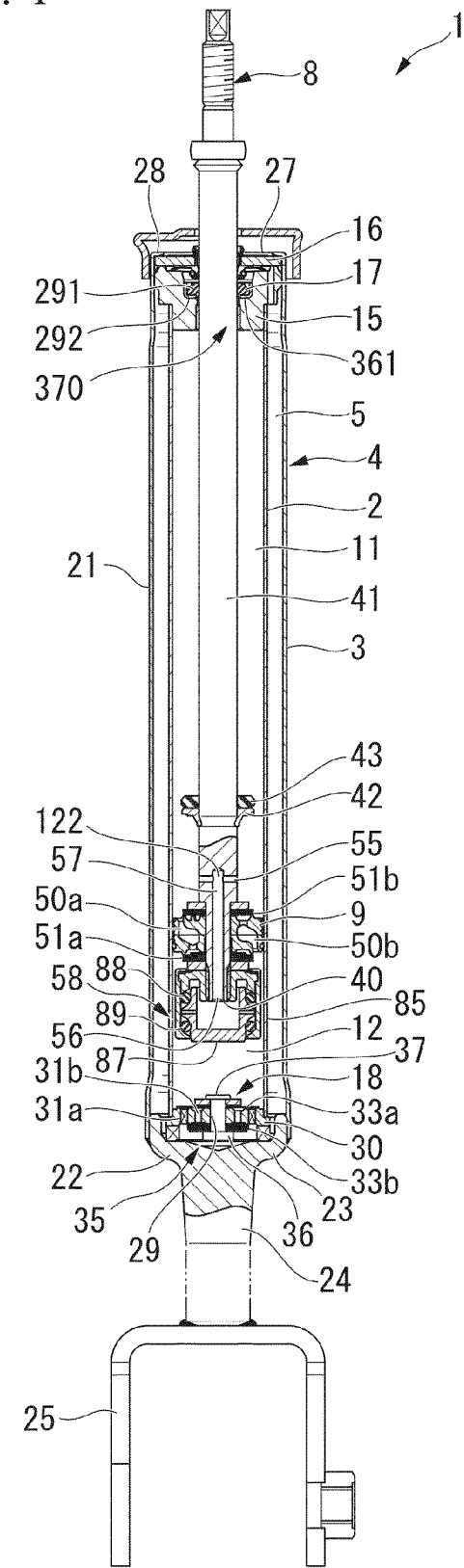
FIG. 1 is a cross-sectional view showing a shock absorber according to an embodiment of the present invention.

A shock absorber 1 according to the embodiment shown in FIG. 1 is a hydraulic shock absorber in which oil is used as a working fluid. The shock absorber 1 has a dual tube type cylinder 4 having an inner tube 2 and an outer tube 3. The outer tube 3 has a larger diameter than the inner tube 2, and is disposed concentrically with the inner tube 2 to cover the inner tube 2. A space between the inner tube 2 and the outer tube 3 becomes a reservoir chamber 5. In addition, the embodiment is not limited to the dual tube type but may also be used in a single tube type shock absorber.

Figure 2:
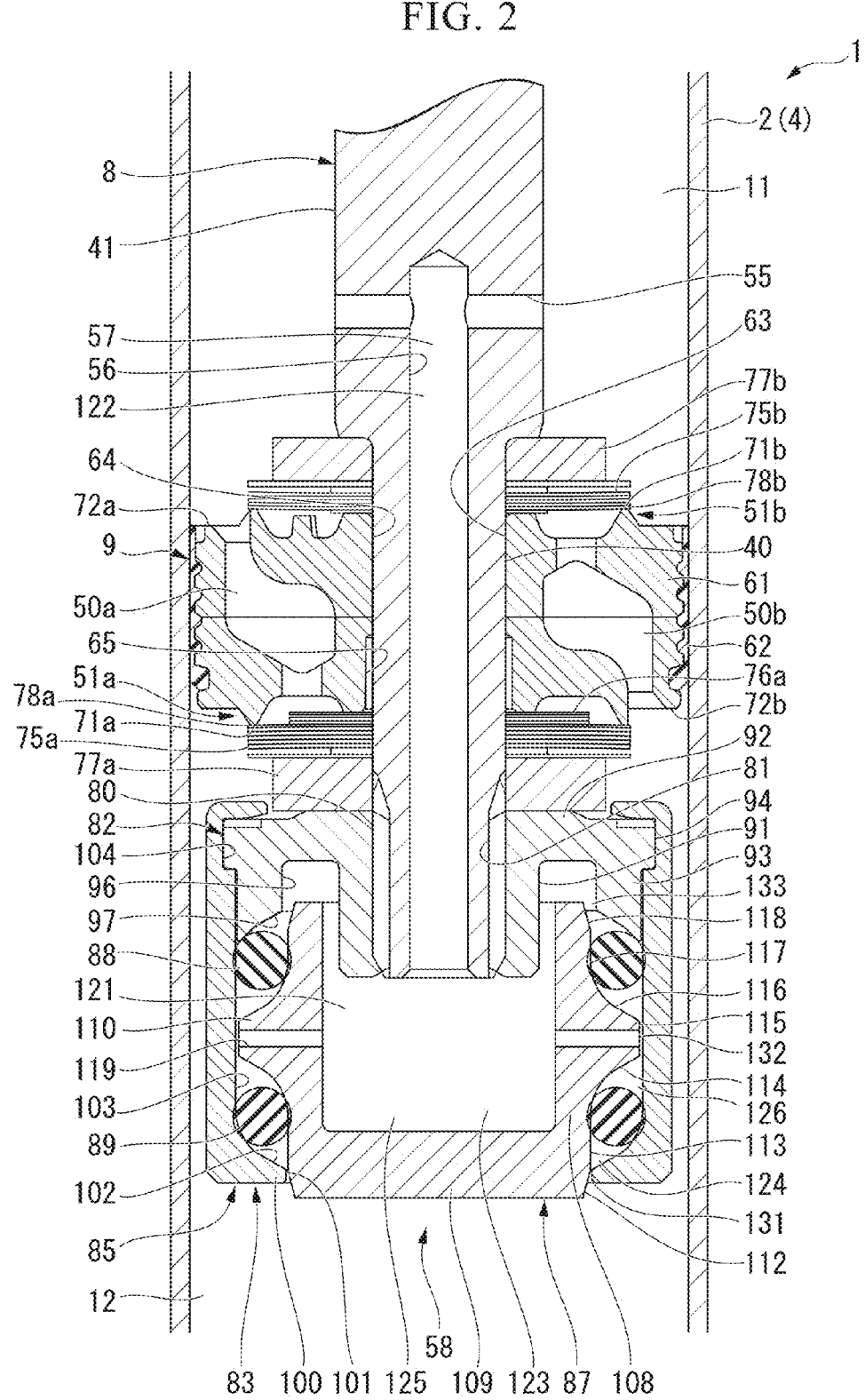
FIG. 2 is an enlarged cross-sectional view showing peripheral parts of a piston of the shock absorber according to the embodiment of the present invention.

As shown in FIG. 2, the shock absorber 1 has a piston rod 8 and a piston 9. As shown in FIG. 1, the piston 9 is connected to one end section in an axial direction of the piston rod 8. Accordingly, the piston 9 is integrally moved with the piston rod 8. The piston rod 8 is disposed on a central axis of the inner tube 2 and the outer tube 3. A portion of the piston rod from one end in the axial direction to a center section is inserted into the inner tube 2 and the outer tube 3 (i.e., the cylinder 4), and the other end in the axial direction extends to the outside from the inner tube 2 and the outer tube 3 (i.e., the cylinder 4). The piston 9 is slidably inserted into the inner tube 2 of the cylinder 4, and partitions the inside of the inner tube 2 into two chambers 11 and 12. The piston rod 8 is disposed to pass through the chamber 11 of the chambers 11 and 12. In other words, the chamber 11 is a rod-side chamber in which the piston rod 8 is disposed in the shock absorber 1.

The oil is enclosed in the inner tube 2 of the cylinder 4 as the working fluid, and the oil and a high pressure (about 20 to 30 atmospheric pressures) gas are enclosed in the reservoir chamber 5 between the inner tube 2 and the outer tube 3 of the cylinder 4 as the working fluid. That is, the working fluid is enclosed in the cylinder 4 having the inner tube 2 and the outer tube 3. In addition, atmospheric pressure air may be enclosed in the reservoir chamber 5 instead of the high pressure gas.

Figure 3:
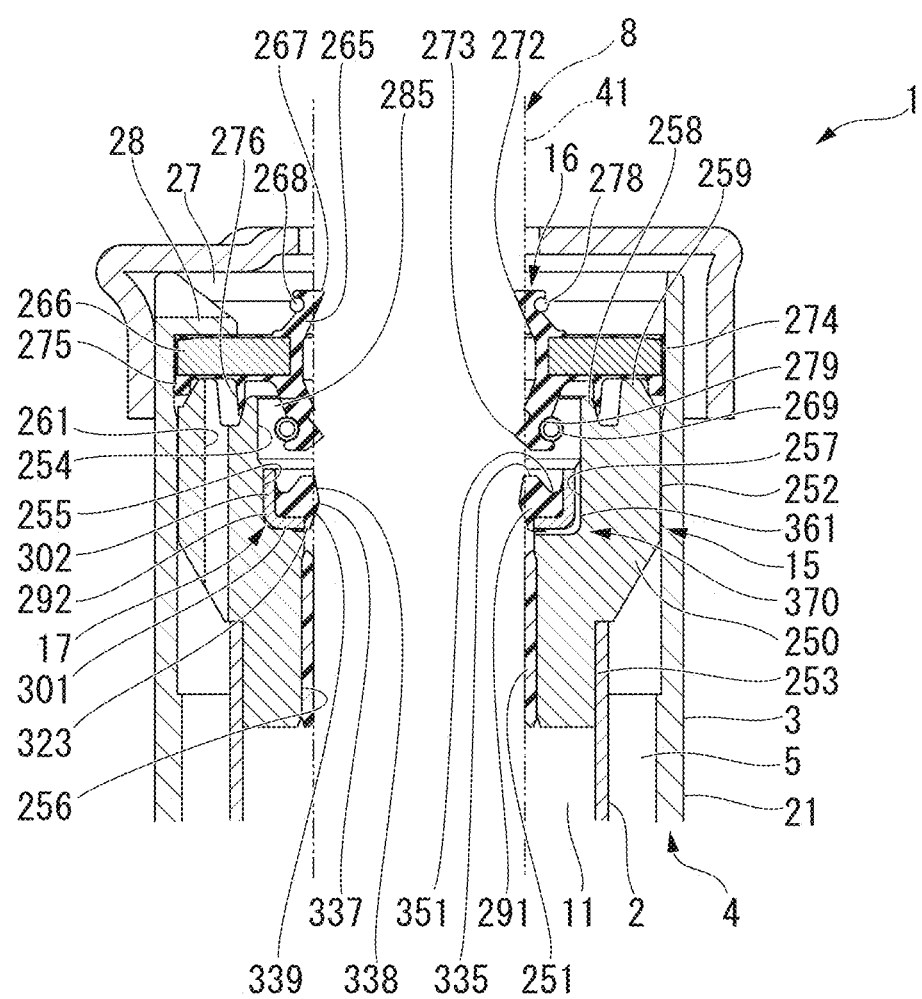
FIG. 3 is an enlarged cross-sectional view showing peripheral parts of a rod guide of the shock absorber according to the embodiment of the present invention.

As shown in FIG. 3, the shock absorber 1 has a rod guide 15, a sealing member 16 and a friction member 17. In addition, the shock absorber 1 has a base valve 18 as shown in FIG. 1. The rod guide 15 is disposed at an end position of an outward protrusion side of the piston rod 8 in the cylinder 4, fitted into the outer tube 3, and also fitted into the inner tube 2. The sealing member 16 is disposed at an outer side (an upper side in an upward/downward direction of FIGS. 1 to 3) with respect to the rod guide 15 in an inward/outward direction (an upward/downward direction of FIGS. 1 to 3, hereinafter referred to as a cylinder inward/outward direction) in the axial direction of the cylinder 4, which is the end section of the cylinder 4. The friction member 17 is disposed at an inner side (a lower side in the upward/downward direction of FIGS. 1 to 3) in the cylinder inward/outward direction with respect to the sealing member 16 and between the sealing member 16 and the rod guide 15. The base valve 18 is disposed at the end section in the axial direction in the cylinder 4 opposite to the rod guide 15, the sealing member 16 and the friction member 17.

As shown in FIG. 3, all of the rod guide 15, the sealing member 16 and the friction member 17 have annular shapes. The piston rod 8 is slidably inserted into the inside of the rod guide 15, the sealing member 16 and the friction member 17. The rod guide 15 movably supports the piston rod 8 in the axial direction while restricting movement in a radial direction thereof, and guides movement of the piston rod 8. An inner circumferential section of the sealing member 16 comes in sliding contact with an outer circumferential section of the piston rod 8 moving in the axial direction to prevent leakage of the oil in the inner tube 2 and the high pressure gas and oil of the reservoir chamber 5 in the outer tube 3 to the outside. An inner circumferential section of the friction member 17 comes in sliding contact with the outer circumferential section of the piston rod 8 to generate a frictional resistance at the piston rod 8. In addition, the friction member 17 is not provided for the purpose of sealing.

As shown in FIG. 1, the outer tube 3 of the cylinder 4 is constituted by a cylindrical barrel member 21 and a bottom cover member 22, and the bottom cover member 22 is fitted into one end in the axial direction of the barrel member 21. The bottom cover member 22 has a bottom cover section 23 and a rod-shaped section 24. An outer circumferential section of the bottom cover section 23 is fitted into an inner circumferential section of the barrel member 21. The rod-shaped section 24 extends toward an opposite side of the barrel member 21 from a center in the radial direction of the bottom cover section 23. The bottom cover member 22 is fixed to the barrel member 21 by welding in a state that the bottom cover section 23 is fitted into the barrel member 21 so as to be a sealed state. An attachment member 25 is fixed to the rod-shaped section 24 opposite to the bottom cover section 23 by welding. The chamber 12 near the bottom cover section 23 of the cylinder 4, of the chambers 11 and 12, is a bottom-side chamber in the cylinder 4.

As shown in FIG. 3, the barrel member 21 has an opening section 27 formed at an opposite side of the bottom cover member 22, and a locking section 28 formed at the opening section 27. The above-mentioned sealing member 16 and the rod guide 15 are fitted into the opening section 27 side of the barrel member 21. The locking section 28 protrudes inward in the radial direction from the end position of the opening section 27 in the barrel member 21 to sandwich the sealing member 16 between the rod guide 15 and the locking section 28.

As shown in FIG. 1, a base body 30 of the base valve 18 is disposed at an inner side in the cylinder inward/outward direction (an upper side in the upward/downward direction of FIG. 1) of the bottom cover section 23 of the outer tube 3. The base body 30 partitions the chamber 12 and the reservoir chamber 5 in the cylinder 4. The base body 30 has a stepped shape in which one side in the axial direction has a smaller diameter than the other side. The base body 30 is placed on the bottom cover section 23 at a large diameter side thereof.

The inner tube 2 of the cylinder 4 has a cylindrical shape. In the inner tube 2, one end side in the axial direction is fitted into and supported by the small diameter side of the base body 30 of the base valve 18, and the other end side in the axial direction is fitted into and supported by the rod guide 15 inside the opening section 27 of the outer tube 3.

A through-hole 29 passing in the axial direction is formed in the base body 30 of the base valve 18 at a center in the radial direction, and passages 31a and 31b passing through the base body 30 in the axial direction are formed around the through-hole 29. These passages 31a and 31b are in communication with the chamber 12 in the inner tube 2 and the reservoir chamber 5 between the outer tube 3 and the inner tube 2. In addition, a disk valve 33a is disposed at the base body 30 opposite to the bottom cover section 23, and a disk valve 33b is disposed at the base body 30 at the bottom cover section 23 side. The disk valve 33a is a check valve, which is configured to open and close the passage 31a of the outside. The disk valve 33b is a damping valve, which is configured to open and close the passage 31b therein. A rivet 35 is inserted into the through-hole 29 of the base body 30 from the bottom cover section 23 side. The disk valves 33a and 33b are clamped by a head section 36 of one end of the rivet 35 and a swaging section 37 of the other end at inner portions in the radial direction thereof, and attached to the base body 30.

The disk valve 33b allows a flow of the oil from the chamber 12 toward the reservoir chamber 5 via a passage hole (not shown) of the disk valve 33a and the passage 31b of the base body 30 to generate a damping force and restrict the flow of the oil in a reverse direction. On the other hand, the disk valve 33a allows a flow of the oil from the reservoir chamber 5 toward the chamber 12 via the passage 31a of the base body 30 with no resistance and restricts a flow of the oil in the reverse direction. The disk valve 33b is a compression side damping valve configured to open a passage 31 when the piston rod 8 is moved to a compression side to increase an approach amount to the cylinder 4 and the piston 9 is moved to the chamber 12 side to raise a pressure of the chamber 12, and generate a damping force at this time. In addition, the disk valve 33a is a suction valve configured to open the passage 31a when the piston rod 8 is moved to an extension side to increase a protruding amount from the cylinder 4 and the piston 9 is moved to the chamber 11 side to lower the pressure of the chamber 12, but allows a flow of the oil while substantially not generating a damping force from the reservoir chamber 5 into the chamber 12 at this time.

When the piston rod 8 is moved to the extension side to increase the protruding amount from the cylinder 4, the oil corresponding thereto flows from the reservoir chamber 5 into the chamber 12 via the passage 31a while opening the disk valve 33a. On the other hand, when the piston rod 8 is moved to the compression side to increase an insertion amount to the cylinder 4, the oil corresponding thereto flows from the chamber 12 into the reservoir chamber 5 via the passage 31b while opening the disk valve 33b.

In addition, the damping force of the extension side may be positively generated by the disk valve 33a, which is a check valve. In addition, these disk valves 33a and 33b may be omitted to form an orifice.

The piston rod 8 has an attachment shaft section 40 and a main shaft section 41. The attachment shaft section 40 is a portion to which the piston 9 is attached, and formed at an insertion tip side of the piston rod 8 into the cylinder 4. The main shaft section 41 is a portion of the piston rod 8 other than the attachment shaft section 40, and has a larger diameter than the attachment shaft section 40. A retainer 42 spreading outward in the radial direction is fixed to the main shaft section 41, and a shock absorbing body 43 formed of an annular elastic material is provided at the retainer 42 opposite to the attachment shaft section 40.

As shown in FIG. 2, a plurality of (only one is shown in FIG. 2 since a cross-sectional view is shown) passages 50a (first passages) and a plurality of (only one is shown in FIG. 2 since a cross-sectional view is shown) passages 50b (first passages) are formed in the piston 9. These passages 50a and these passages 50b are in communication with the chamber 11 and the chamber 12. Upon movement of the piston 9 toward the chamber 11, i.e., in an extension stroke in which the piston rod 8 extends from the cylinder 4, a damping force generation mechanism 51b (to be described below) installed with respect to the passage 50b closes the passage 50b. For this reason, the oil flows out of the chamber 11, which is one of the chamber 11 and the chamber 12, toward the chamber 12, which is the other of them, through the passage 50a by movement of the piston 9. Meanwhile, upon movement of the piston 9 toward the chamber 12, i.e., in a compression stroke in which the piston rod 8 enters the cylinder 4, a damping force generation mechanism 51a (to be described below) installed with respect to the passage 50a closes the passage 50a. For this reason, the oil flows out of the chamber 12, which is the other of the chamber 11 and the chamber 12, toward the chamber 11, which is the one of them, through the passage 50b by movement of the piston 9. The passages 50a and the passages 50b, which are the same in number, are formed in the piston 9.

The passages 50a are formed at the same pitch such that the neighboring passages 50a sandwich one of the passages 50b in the circumferential direction. One side (the chamber 11 side) of the passage 50a in the axial direction of the piston 9 is opened outside in the radial direction, and the other side in the axial direction (the chamber 12 side) is opened inside in the radial direction. Then, the damping force generation mechanism 51a (a first damping force generation mechanism) configured to generate a damping force is installed at these passages 50a. The damping force generation mechanism 51a is disposed at the chamber 12 side in the axial direction of the piston 9. The passage 50a constitutes a passage of the extension side in which the oil flows out of the chamber 11 upon the above-mentioned extension stroke. The damping force generation mechanism 51a installed with respect to the passage 50a is a damping force generation mechanism of the extension side in which a flow of the oil of the passage 50a of the extension side is suppressed to generate a damping force.

In addition, the passages 50b are formed at the same pitch such that the neighboring passages 50b sandwich one of the passages 50a in the circumferential direction. The other side (the chamber 12 side) of the passage 50b in the axial direction of the piston 9 is opened outside in the radial direction, and one side in the axial direction (the chamber 11 side) is opened inside in the radial direction. Then, the damping force generation mechanism Sib (a first damping force generation mechanism) configured to generate a damping force is installed at these passages 50b. The damping force generation mechanism 51b is disposed at the chamber 11 side in the axial direction of the piston 9. The passage 50b constitutes a passage of the compression side at which the oil flows out of the chamber 12 upon the above-mentioned compression stroke. The damping force generation mechanism 51b installed with respect to the passage 50b is a damping force generation mechanism of the compression side configured to suppress a flow of the oil of the passage 50b of the compression side to generate a damping force.

As shown in FIG. 1, a passage hole 55 in the radial direction is formed in the piston rod 8 at a position between the piston 9 of the main shaft section 41 and the retainer 42. In addition, as shown in FIG. 2, a passage hole 56 having a larger diameter than the passage hole 55 is formed in the piston rod 8 toward the attachment shaft section 40 in the axial direction. The passage hole 56 is in communication with the passage hole 55 to be opened at the tip section of the attachment shaft section 40. These passage holes 55 and 56 constitute a rod-inside passage 57 formed in the piston rod 8, and the passage hole 55 side of the rod-inside passage 57 is always in communication with the chamber 11.

A damping force varying mechanism 58 is attached to the piston rod 8 at an opposite side of the main shaft section 41 with respect to the piston 9 of the attachment shaft section 40. The damping force varying mechanism 58 is attached to cover the passage hole 56 of the rod-inside passage 57, and the inside thereof is in communication with the rod-inside passage 57.

Figure 4:
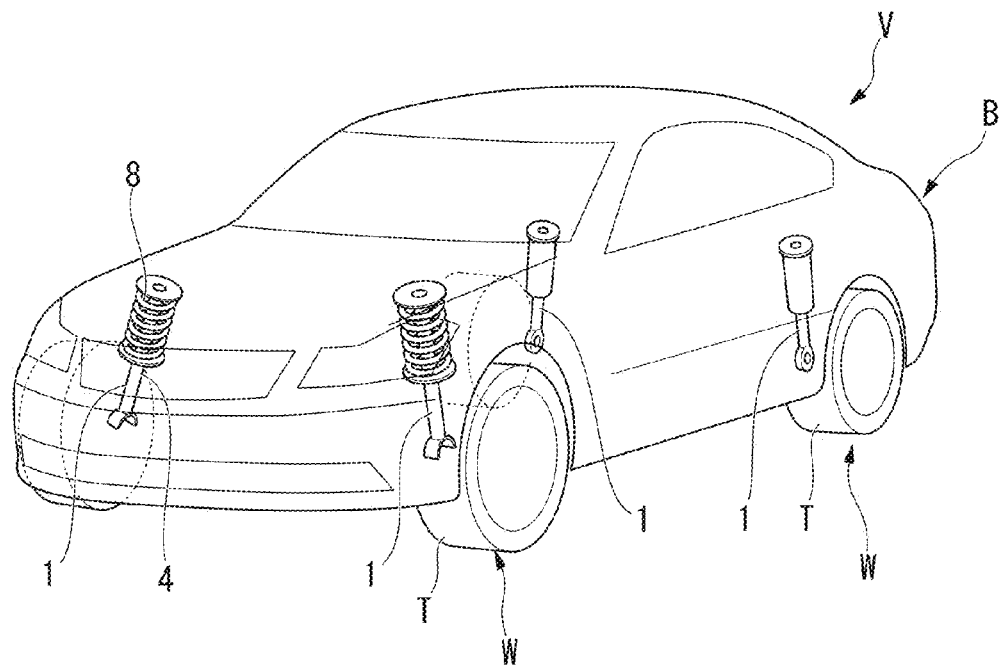
FIG. 4 is a transparent perspective view schematically showing a state in which the shock absorber according to the embodiment of the present invention is installed in a vehicle.

As schematically shown in FIG. 4, the above-mentioned shock absorber 1 is installed with respect to each wheel W of a vehicle V. Here, for example, one side of the shock absorber 1 is supported by a vehicle body B, and the other side is fixed to the wheel W side. Specifically, the shock absorber 1 is connected to the vehicle body B side at the piston rod 8, and connected to the wheel W side at the cylinder 4 opposite to the protrusion side of the piston rod 8. In addition, conversely, the other side of the shock absorber may be supported by the vehicle body B and one side of the shock absorber may be fixed to the wheel W side.

When the wheel W vibrates due to driving, while a relative position between the cylinder 4 and the piston rod 8 is varied according to the vibrations, the variation is suppressed by a fluid resistance of the passages formed in the piston 9 shown in FIG. 2. As will be described below, since the fluid resistance of the passage formed in the piston 9 is set to be different according to a speed or an amplitude of the vibrations, and riding comfort is improved by suppressing the vibrations. In addition to the vibrations generated from the wheel W, an inertial force or a centrifugal force generated from the vehicle body B caused by the running of the vehicle V is also applied between the cylinder 4 and the piston rod 8. For example, the centrifugal force is generated at the vehicle body B by varying a running direction through the steering wheel manipulation, and a force based on the centrifugal force is applied between the cylinder 4 and the piston rod 8. As will be described below, the shock absorber 1 of the embodiment has good properties with respect to the vibrations based on the force generated at the vehicle body B caused by the running of the vehicle V, and high stability upon the running of the vehicle V can be obtained.

As shown in FIG. 2, the piston 9 has a substantially disk-shaped piston main body 61 and a sliding contact member 62 mounted on an outer circumferential surface of the piston main body 61. The piston 9 comes in sliding contact with the inside of the cylinder 4 at the sliding contact member 62. An insertion hole 63 is formed to pass through a center in the radial direction of the piston main body 61 in the axial direction, and the attachment shaft section 40 of the piston rod 8 is inserted into the insertion hole 63. One side in the axial direction of the insertion hole 63 is a small diameter hole section 64, and the other side in the axial direction is a large diameter hole section 65 having a larger diameter than the small diameter hole section 64. In addition, the passages 50a and 50b are formed at the piston main body 61 to surround the insertion hole 63.

A seat section 71a is formed at an end section of the chamber 12 side in the axial direction of the piston main body 61. The seat section 71a is formed annularly at the outside of one end opening position of the passage 50a of the extension side. A seat section 71b is formed at an end section of the chamber 11 side in the axial direction of the piston main body 61. The seat section 71b is formed annularly at the outside of one end opening position of the passage 50b of the compression side. The seat section 71a constitutes the damping force generation mechanism 51a. The seat section 71b constitutes the damping force generation mechanism 51b.

In the piston main body 61, a portion of the seat section 71a opposite to the insertion hole 63 is an annular step section 72b having a smaller height in the axial direction than the seat section 71a. The other end of the passage 50b of the compression side is opened at a position of the step section 72b. In addition, similarly, in the piston main body 61, a portion of the seat section 71b opposite to the insertion hole 63 is an annular step section 72a having a smaller height in the axial direction than the seat section 71b. The other end of the passage 50a of the extension side is opened at a position of the step section 72a.

The damping force generation mechanism 51a is a disk valve constituted by the seat section 71a and an annular disk 75a which can be simultaneously seated on the entire seat section 71a. The disk 75a is configured by overlapping a plurality of annular single disks. A spacer 76a having a smaller diameter than the disk 75a is disposed at the piston main body 61 side of the disk 75a, and the annular valve restriction member 77a having a smaller diameter than the disk 75a is disposed at a portion of the disk 75a opposite to the piston main body 61.

The damping force generation mechanism 51a has a fixed orifice 78a disposed between the seat section 71a and the disk 75a and configured to bring the passage 50a in communication with the chamber 12 even when the seat section 71a and the disk 75a abut each other. The fixed orifice 78a is formed by a groove formed in the seat section 71a or an opening formed in the disk 75a. The disk 75a is separated from the seat section 71a to open the passage 50a. Here, the valve restriction member 77a restricts deformation of the disk 75a in the opening direction exceeding a prescribed amount. The damping force generation mechanism 51a is installed at the passage 50a to suppress a flow of the oil generated at the passage 50a by sliding of the piston 9 toward the chamber 11, and thereby generates the damping force.

Similarly, the damping force generation mechanism 51b is a disk valve constituted by the seat section 71b and an annular disk 75b which can be simultaneously seated on the entire seat section 71b. The disk 75b is also configured by overlapping a plurality of annular single disks. An annular valve restriction member 77b having a smaller diameter than the disk 75b is disposed at a portion of the disk 75b opposite to the piston main body 61. The valve restriction member 77b abuts an end surface of the attachment shaft section 40 side of the main shaft section 41 of the piston rod 8.

The damping force generation mechanism 51b has a fixed orifice 78b disposed between the seat section 71b and the disk 75b and configured to bring the passage 50b in communication with the chamber 11 even when the seat section 71b and the disk 75b are in an abutting state. The fixed orifice 78b is formed by a groove formed in the seat section 71b or an opening formed in the disk 75b. The disk 75b is separated from the seat section 71b to open the passage 50b, and here, the valve restriction member 77b restricts deformation of the disk 75b in the opening direction exceeding a prescribed amount. The damping force generation mechanism 51b is installed at the passage 50b to suppress a flow of the oil generated at the passage 50b by sliding of the piston 9 toward the chamber 12, and thereby generates the damping force.

In the embodiment, while an example in which the damping force generation mechanisms 51a and 51b are disk valves of inner circumference clamps has been described, the present invention is not limited thereto but may be a mechanism configured to generate a damping force, for example, a lift type valve configured to bias a disk valve using a coil spring, or a poppet valve.

A male screw 80 is formed at a tip of the attachment shaft section 40 of the piston rod 8, and the above-mentioned damping force varying mechanism 58 is threadedly engaged with the male screw 80. The damping force varying mechanism 58 is a frequency response unit configured to vary the damping force by a frequency (a vibration state) without being controlled from the outside. The damping force varying mechanism 58 sandwiches the valve restriction member 77a, the disk 75a, the spacer 76a, the piston 9, the disk 75b and the valve restriction member 77b between an end surface of the main shaft section 41 of the piston rod 8 in a state in which the damping force varying mechanism 58 is threadedly engaged with the male screw 80, thereby also functions as a nut.

The damping force varying mechanism 58 is constituted by a housing 85 formed of a cover member 82 and a housing main body 83, a free piston 87, an O-ring 88 (a spring member), and an O-ring 89 (a spring member). A female screw 81 threadedly engaged with the male screw 80 of the one end side of the piston rod 8 is formed at the cover member 82. The housing main body 83 has a substantially cylindrical shape such that the one end opening side is attached to the cover member 82 to be closed. The free piston 87 is slidably inserted into the housing 85. The O-ring 88 is an elastic body of the compression side interposed between the free piston 87 and the cover member 82 of the housing 85 to be compressively deformed when the free piston 87 is moved to the cover member 82 side in the axial direction with respect to the housing 85. The O-ring 89 is an elastic body of the extension side interposed between the free piston 87 and the housing main body 83 of the housing 85 to be compressively deformed when the free piston 87 is moved to an opposite side of the above with respect to the housing 85. In addition, FIG. 2 shows the O-rings 88 and 89 in a natural state for the sake of convenience. In particular, since the O-ring 89 also functions as a seal, the O-ring 89 may be disposed to be deformed in a non-circular cross section always in the attached state. The above-mentioned O-ring 88 is a resistance element configured to be compressively deformed to generate a resisting force with respect to the displacement of the free piston 87 when the free piston 87 is moved in one direction, and the O-ring 89 is a resistance element compressively deformed to generate a resisting force with respect to the displacement of the free piston 87 when the free piston 87 is moved in the other direction.

The cover member 82 is formed mainly by cutting. The cover member 82 has a cover inner tube section 91, a cover base plate section 92, a cover outer tube section 93 and a fitting convex section 94. The cover inner tube section 91 has a substantially cylindrical shape, and the female screw 81 is formed at the inner circumferential section thereof. The cover base plate section 92 has a bored disk shape extending from the one end section in the axial direction of the cover inner tube section 91 outward in the radial direction. The cover outer tube section 93 extends from the outer circumferential side of the cover base plate section 92 in the same direction as the cover inner tube section 91. The fitting convex section 94 has an annular shape protruding from the same side as the cover base plate section 92 in the axial direction of the cover outer tube section 93 outward in the radial direction.

The inner circumferential section of the cover outer tube section 93 of the cover inner tube section 91 has a cylindrical surface section 96 and an inclined surface section 97 in sequence from the cover base plate section 92 side. The cylindrical surface section 96 has a constant diameter. The inclined surface section 97 is connected to the cylindrical surface section 96, and has an annular shape having a diameter that increases away from the cylindrical surface section 96 in the axial direction. The inclined surface section 97 has a substantially arc-shaped cross section including a central axis of the cover member 82.

The housing main body 83 is formed mainly by cutting, and the housing main body 83 has a substantially cylindrical shape. The housing main body 83 has an inner annular protrusion 100 protruding from one side in the axial direction inward in the radial direction. A small diameter cylindrical surface section 101, an inclined surface section 102, a large diameter cylindrical surface section 103 and a fitting cylindrical surface section 104 are formed at the inner circumferential section of the housing main body 83 in sequence from one side in the axial direction. The small diameter cylindrical surface section 101 has a constant diameter. The inclined surface section 102 is connected to the small diameter cylindrical surface section 101, and has an annular shape having a diameter that increases away from the small diameter cylindrical surface section 101. The large diameter cylindrical surface section 103 is connected to the inclined surface section 102, and has a constant diameter larger than the small diameter cylindrical surface section 101. The inclined surface section 102 has a substantially arc-shaped cross-section including a central axis of the housing main body 83. The small diameter cylindrical surface section 101 and the inclined surface section 102 are formed at the inner annular protrusion 100. In addition, while the housing main body 83 has been described as having a cylindrical shape, the inner circumferential section may have a circular cross section, and the outer circumferential surface may have a non-circular cross section such as a polygonal shape.

In the above-mentioned housing main body 83, under a state in which the fitting cylindrical surface section 104 extends to the end section opposite to the inner annular protrusion 100 in the axial direction, the fitting convex section 94 of the cover member 82 is fitted into the fitting cylindrical surface section 104. After that, as a portion of the housing main body 83 opposite to the inner annular protrusion 100 in the axial direction rather than the fitting convex section 94 is bent inward, the housing main body 83 and the cover member 82 are integrated to form the housing 85. The cover outer tube section 93 of the cover member 82 constitutes an annular small diameter section protruding inward in the radial direction more than the large diameter cylindrical surface section 103 in the housing 85, and the inclined surface section 97 is formed at a portion thereof. In addition, the inner annular protrusion 100 of the housing main body 83 constitutes an annular small diameter section protruding inward in the radial direction more than the large diameter cylindrical surface section 103 in the housing 85, and the inclined surface section 102 is formed at a portion thereof. The inclined surface section 97 and the inclined surface section 102 are disposed opposite each other in the axial direction.

The free piston 87 is formed mainly by cutting. The free piston 87 has a substantially cylindrical piston tube section 108 and a plate-shaped piston closing plate section 109. The piston closing plate section 109 is formed to close one side in the axial direction of the piston tube section 108. An outer annular protrusion 110 is formed at the piston tube section 108 at an intermediate position in the axial direction. The outer annular protrusion 110 has an annular shape having a larger diameter than the other portion of the piston tube section 108 and protruding outward in the radial direction. The outer annular protrusion 110 is formed at to be slightly deviated to an opposite side of the piston closing plate section 109 from the central position in the axial direction of the free piston 87.

A tapered surface section 112, a small diameter cylindrical surface section 113, an inclined surface section 114, a large diameter cylindrical surface section 115, an inclined surface section 116, a small diameter cylindrical surface section 117 and a tapered surface section 118 are formed at the outer circumferential surface of the piston tube section 108 in sequence from the piston closing plate section 109 side in the axial direction. The inclined surface section 114, the large diameter cylindrical surface section 115 and the inclined surface section 116 are formed on the outer annular protrusion 110.

The tapered surface section 112 has a tapered shape having a diameter that decreases toward an opposite side of the small diameter cylindrical surface section 113 in the axial direction. The small diameter cylindrical surface section 113 is connected to the large diameter side of the tapered surface section 112 and has a constant diameter. The inclined surface section 114 is connected to the small diameter cylindrical surface section 113, and has an annular shape having a diameter that increases away from the small diameter cylindrical surface section 113 in the axial direction. The large diameter cylindrical surface section 115 is connected to the large diameter side of the inclined surface section 114, and has a constant diameter larger than the small diameter cylindrical surface section 113. The inclined surface section 114 has a substantially arc-shaped cross section including a central axis of the free piston 87.

The inclined surface section 116 is connected to the large diameter cylindrical surface section 115, and has an annular shape having a diameter that decreases away from the large diameter cylindrical surface section 115. The small diameter cylindrical surface section 117 is connected to the small diameter side of the inclined surface section 116. The small diameter cylindrical surface section 117 has a constant diameter equal to a diameter of the small diameter cylindrical surface section 113. The tapered surface section 118 is connected to the small diameter cylindrical surface section 117, and has a tapered shape having a diameter that decreases toward an opposite side of the small diameter cylindrical surface section 117 in the axial direction. The inclined surface section 116 has a substantially arc-shaped cross-section including a central axis of the free piston 87. The outer annular protrusion 110 has a symmetrical shape with respect to a plane passing through a central position thereof in the axial direction. A plurality of passage holes 119 are formed in the free piston 87 at predetermined intervals in the circumferential direction of the free piston 87. The passage holes 119 are formed at the central position in the axial direction of the outer annular protrusion 110, and pass through the outer annular protrusion 110 in the radial direction.

The free piston 87 is disposed in the housing 85 such that the piston closing plate section 109 is disposed at the inner annular protrusion 100 side in the axial direction. In a state in which the free piston 87 is disposed in the housing 85, the large diameter cylindrical surface section 115 moves a position of the large diameter cylindrical surface section 103 of the housing main body 83 in the axial direction. In addition, in a state in which the free piston 87 is disposed in the housing 85, the tapered surface section 112 and the small diameter cylindrical surface section 113 of the one side move a position of the small diameter cylindrical surface section 101 of the housing main body 83 in the axial direction. Further, in a state in which the free piston 87 is disposed in the housing 85, the small diameter cylindrical surface section 117 and the tapered surface section 118 of the other side move a position of the cylindrical surface section 96 of the cover outer tube section 93 of the cover member 82 in the axial direction.

In a state in which the free piston 87 is disposed in the housing 85, the inclined surface section 102 of the housing main body 83 and the inclined surface section 114 of the free piston 87 overlap each other in the radial direction thereof. Accordingly, the inclined surface section 102 of the housing main body 83 and the inclined surface section 114 of the free piston 87 oppose each other in a moving direction of the free piston 87. In addition, the inclined surface section 97 of the cover outer tube section 93 of the cover member 82 and the inclined surface section 116 of the free piston 87 overlap each other in the radial direction thereof. Accordingly, the inclined surface section 97 of the cover member 82 and the inclined surface section 116 of the free piston 87 oppose each other in the moving direction of the free piston 87.

Then, the O-ring 89 (a natural state is shown in FIG. 2) is disposed between the small diameter cylindrical surface section 113 and the inclined surface section 114 of the free piston 87, and the inclined surface section 102 and the large diameter cylindrical surface section 103 of the housing main body 83. In other words, the O-ring 89 is disposed between the outer annular protrusion 110 of the free piston 87 and the inner annular protrusion 100 of the housing 85. The O-ring 89 has a circular cross section including a central axis when the O-ring 89 is in a natural state. The O-ring 89 has an inner diameter smaller than the small diameter cylindrical surface section 113 of the free piston 87 and an outer diameter larger than the large diameter cylindrical surface section 103 of the housing main body 83 when the O-ring 89 is in a natural state. That is, the O-ring 89 is interference-fitted with respect to both the free piston 87 and the housing 85 in the radial direction thereof.

In addition, the O-ring 88 (a natural state is shown in FIG. 2) is disposed between the large diameter cylindrical surface section 103 and the inclined surface section 97 of the housing 85, and the inclined surface section 116 and the small diameter cylindrical surface section 117 of the free piston 87. In other words, the O-ring 88 is disposed between the outer annular protrusion 110 of the free piston 87 and the cover outer tube section 93 of the housing. The O-ring 88 has a circular cross section including a central axis when the O-ring 88 is in a natural state. The O-ring 88 has an inner diameter smaller than the small diameter cylindrical surface section 117 of the free piston 87 and an outer diameter larger than the large diameter cylindrical surface section 103 of the housing 85 when the O-ring 88 is in a natural state. That is, the O-ring 88 is also interference-fitted with respect to both the free piston 87 and the housing 85 in the radial direction thereof.

Both of the O-rings 88 and 89 are common parts having the same size, and bias the free piston 87 against the housing 85 in the housing 85 to hold the free piston 87 at a predetermined neutral position in the axial direction. In addition, the O-rings 88 and 89 are elastically deformed to allow movement of the free piston 87 with respect to the housing 85 toward both sides in the axial direction.

In the free piston 87, the O-ring 88 is in contact with the small diameter cylindrical surface section 117 and the inclined surface section 116. Between the inclined surface section 116 and the small diameter cylindrical surface section 117, the inclined surface section 116 is inclined to the moving direction of the free piston 87. In addition, in the housing 85, the O-ring 88 is in contact with the large diameter cylindrical surface section 103 and the inclined surface section 97 of the housing 85. Between the inclined surface section 97 and the large diameter cylindrical surface section 103, the inclined surface section 97 is inclined to the moving direction of the free piston 87.

In other words, the outer annular protrusion 110 is installed at the outer circumferential section of the free piston 87, and both surfaces in the axial direction of the outer annular protrusion 110 constitute the inclined surface section 114 and the inclined surface section 116. In addition, the inner annular protrusion 100 having the inclined surface section 102 and the cover outer tube section 93 having the inclined surface section 97 are formed at both side positions of the outer annular protrusion 110 in the inner circumference of the housing 85. Further, the O-ring 89 and the O-ring 88 are installed between the outer annular protrusion 110 and the inner annular protrusion 100, and between the outer annular protrusion 110 and the cover outer tube section 93, respectively.

In addition, when the damping force varying mechanism 58 is assembled, for example, the O-ring 89 is inserted into the housing main body 83 to a position of the inclined surface section 102. Then, the free piston 87 is fitted into the housing main body 83 and the O-ring 89. Here, in the free piston 87, the large diameter cylindrical surface section 115 is guided to the large diameter cylindrical surface section 103 of the housing main body 83, and then the tapered surface section 112 is inserted into the O-ring 89 and the small diameter cylindrical surface section 101 of the housing main body 83 from the small diameter side. Next, the O-ring 88 is inserted between the housing main body 83 and the free piston 87 to a position of the inclined surface section 116. Then, the cover member 82 is fitted into the housing main body 83 and swage the housing main body 83. The damping force varying mechanism 58, which is previously assembled as described above, is attached by threadedly engaging the female screw 81 with the male screw 80 of the attachment shaft section 40 of the piston rod 8. Here, the cover base plate section 92 of the housing 85 abuts the valve restriction member 77a. An outer diameter of the damping force varying mechanism 58, i.e., an outer diameter of the housing 85, is set to be smaller than an inner diameter of the inner tube 2 such that flow path resistance is not provided.

The rod-inside passage 57, which is always in communication with the chamber 11 as described above, is formed in the piston rod 8. A housing-inside passage 121, which is always in communication with the rod-inside passage 57, is formed in the housing 85. The rod-inside passage 57 and the housing-inside passage 121 constitute a rod-side passage 122 (a second passage). Accordingly, the housing-inside passage 121 is formed in the housing 85 as a portion of the passage of the rod-side passage 122. The free piston 87 is movably installed in the housing 85 to partition the rod-side passage 122 into an upstream side and a downstream side. The rod-side passage 122 is in communication with the chamber 11, which is one of the chamber 11 and the chamber 12 in the inner tube 2. In the rod-side passage 122, when the pressure of the chamber 11 is increased by movement of the piston 9 toward the chamber 11, the oil flows out of the chamber 11. That is, the oil flows out of the chamber 11 through the passage 50a and the rod-side passage 122 which is a separate line from the passage 50a by movement of the piston 9 toward the chamber 11.

The housing-inside passage 121 is partitioned by the O-ring 89, the free piston 87 and the housing 85 into a rod chamber-side passage section 123 in communication with the chamber 11 of the piston rod 8 side and a bottom chamber-side passage section 124 in communication with the chamber 12 of the bottom side. The rod chamber-side passage section 123 is constituted by the chamber 125, the passage hole 119 and the chamber 126. The chamber 125 is surrounded by the cover member 82, the free piston 87 and the O-ring 88, and the rod-inside passage 57 is opened. The passage hole 119 is formed in the free piston 87, and one end thereof is opened in the chamber 125. The chamber 126 is surrounded by the housing main body 83, the O-ring 88, the O-ring 89 and the free piston 87, and the other end of the passage hole 119 is opened. The bottom chamber-side passage section 124 is constituted by a portion surrounded by the inner annular protrusion 100 side of the housing main body 83, the O-ring 89 and the free piston 87.

When the piston 9 is moved toward the chamber 11 in the extension stroke, the oil of the chamber 11 flows to the rod-inside passage 57 and the rod chamber-side passage section 123. Then, the free piston 87 moves toward an opposite side of the cover member 82 in the axial direction with respect to the housing 85 while discharging the oil of the bottom chamber-side passage section 124 into the chamber 12. Here, the one O-ring 89 installed between the free piston 87 and the housing 85 abuts the inclined surface section 114 of the outer annular protrusion 110 disposed between the O-rings 88 and 89 of the outer circumferential section of the free piston 87, and the inclined surface section 102 of the inner annular protrusion 100 of the inner circumferential section of the housing 85, and is sandwiched therebetween to be elastically deformed. That is, the one O-ring 89 generates an elastic force with respect to movement of the free piston 87 to one side in the extension stroke.

When the piston 9 is moved toward the chamber 12 in the compression stroke, the oil of the chamber 12 presses the free piston 87. Then, the free piston 87 is moved toward the cover member 82 in the axial direction with respect to the housing 85 while injecting the oil into the bottom chamber-side passage section 124. Here, the other O-ring 88 installed between the free piston 87 and the housing 85 abuts the inclined surface section 116 of the outer annular protrusion 110 of the outer circumferential section of the free piston 87 and the inclined surface section 97 of the cover outer tube section 93 of the inner circumferential section of the housing 85, and is sandwiched therebetween to be elastically deformed. That is, the other O-ring 88 generates an elastic force with respect to movement of the free piston 87 to the other side in the compression stroke.

As shown in FIG. 3, the rod guide 15 is constituted by a rod guide main body 250 and a collar 251. The rod guide main body 250 is formed of a metal, and has a substantially stepped cylindrical shape. The collar 251 has a cylindrical shape, and is fitted and fixed to the inner circumferential section of the rod guide main body 250. The collar 251 is formed by coating fluororesin impregnation bronze on a cylindrical shaped inner circumference formed of a metal such as an SPCC or SPCE material.

The rod guide main body 250 has an outer shape having a large diameter outer diameter section 252 formed at one side in the axial direction thereof, and a small diameter outer diameter section 253 formed at the other side in the axial direction and having a smaller diameter than the large diameter outer diameter section 252. The large diameter outer diameter section 252 of the rod guide main body 250 is fitted into the inner circumferential section of the barrel member 21 of the outer tube 3, and the small diameter outer diameter section 253 is fitted into the inner circumferential section of the inner tube 2.

A large diameter hole section 254, an intermediate diameter hole section 255 and a small diameter hole section 256 are formed at a center in the radial direction of the rod guide main body 250. The large diameter hole section 254 is formed at the large diameter outer diameter section 252 side in the axial direction of the rod guide main body 250. The intermediate diameter hole section 255 has a slightly smaller diameter than the large diameter hole section 254, and is formed closer to the small diameter outer diameter section 253 side than the large diameter hole section 254 in the axial direction of the rod guide main body 250. The small diameter hole section 256 has a smaller diameter than the intermediate diameter hole section 255, and is formed closer to the small diameter outer diameter section 253 side than the intermediate diameter hole section 255 in the axial direction of the rod guide main body 250.

A communication groove 257 is formed in the intermediate diameter hole section 255 continuing to an inner circumferential section and a bottom surface thereof. The communication groove 257 is formed in the inner circumferential section of the intermediate diameter hole section 255 throughout the entire length in the axial direction, and formed at the bottom surface of the intermediate diameter hole section 255 throughout the entire length in the radial direction. That is, the communication groove 257 is formed to connect the inner circumferential section of the large diameter hole section 254 and the inner circumferential section of the small diameter hole section 256.

A small diameter annular convex section 258 and a large diameter annular convex section 259 having a larger diameter than the small diameter annular convex section 258 are formed at the end section of the large diameter outer diameter section 252 side in the axial direction of the rod guide main body 250. Both of the small diameter annular convex section 258 and the large diameter annular convex section 259 are formed to protrude from the end section of the large diameter outer diameter section 252 side in the axial direction of the rod guide main body 250 outward in the axial direction. A communication hole 261 is formed in the rod guide main body 250 at the large diameter annular convex section 259 side between the large diameter annular convex section 259 and the small diameter annular convex section 258. The communication hole 261 passes through the rod guide main body 250 in the axial direction, and comes in communication with the reservoir chamber 5 between the outer tube 3 and the inner tube 2. The collar 251 is fitted and fixed into the small diameter hole section 256 of the rod guide main body 250. The piston rod 8 is inserted into the rod guide 15 such that the piston 8 is in sliding contact with the collar 251 at the outer circumferential section of the main shaft section 41.

The sealing member 16 is disposed at the one end section in the axial direction of the cylinder 4 to be in press contact with the outer circumferential section of the main shaft section 41 of the piston rod 8 in the inner circumferential section. The sealing member 16 restricts leakage of the oil or the like leaked from the gap between the rod guide 15 and the main shaft section 41 of the piston rod 8 to the outside.

The sealing member 16 is constituted by a sealing member main body 267 integrally formed of a seal section 265 and an annular member 266 having an annular shape, an annular spring 268, and an annular spring 269. The seal section 265 is formed of an elastic rubber material having good slidability such as a nitrile rubber or a fluororubber. The annular member 266 is buried in the seal section 265 to maintain a shape of the sealing member 16 to obtain strength for fixing, and formed of a metal. The spring 268 is fitted into the outer circumferential section outside in the cylinder inward/outward direction of the seal section 265 of the sealing member main body 267. The spring 269 is fitted into the outer circumferential section inside in the cylinder inward/outward direction of the seal section 265. In addition, in FIG. 3, the sealing member 16 is shown in a natural state before the piston rod 8 is inserted (not dug into the piston rod 8).

The seal section 265 has a dust lip 272 having an annular tubular shape, and an oil lip 273 having an annular tubular shape, which are disposed inside in the radial direction of the seal section 265. The dust lip 272 extends from the outside in the cylinder inward/outward direction of the inner circumferential side of the annular member 266 in a direction away from the annular member 266 in the axial direction. The oil lip 273 extends from the inside in the cylinder inward/outward direction of the inner circumferential side of the annular member 266 in a direction away from the annular member 266 in the axial direction. In addition, the seal section 265 has an outer circumferential seal 274, and an annular seal lip 275, which are disposed outside in the radial direction of the seal section 265. The outer circumferential seal 274 covers the outer circumferential surface of the annular member 266 at the outer end position in the radial direction of the seal section 265. The seal lip 275 extends from the outer circumferential seal 274 inward in the cylinder inward/outward direction. Further, the seal section 265 has an annular check lip 276. The check lip 276 extends from the inside in the cylinder inward/outward direction of the intermediate portion in the radial direction inward in the cylinder inward/outward direction.

The dust lip 272 has a tapered pipe shape as a whole having an inner diameter that decreases away from the annular member 266 outward in the cylinder inward/outward direction, and an annular groove 278 into which the spring 268 is fitted is formed in the outer circumferential section to be concaved inward in the radial direction.

The oil lip 273 has a tapered pipe shape as a whole having a diameter that decreases away from the annular member 266 inward in the cylinder inward/outward direction, and an annular groove 279 into which the spring 269 is fitted is formed in the outer circumferential section to be concaved inward in the radial direction. In addition, the oil lip 273 has a stepped shape formed inside in the cylinder inward/outward direction of the inner circumferential section.

The sealing member 16 comes in sealing contact with the inner circumferential section of the barrel member 21 of the outer tube 3 in the outer circumferential seal 274 in a state in which the dust lip 272 is disposed outside in the cylinder inward/outward direction and the oil lip 273 is disposed inside in the cylinder inward/outward direction. In this state, in the sealing member 16, a position of the annular member 266 is sandwiched and locked between the large diameter annular convex section 259 of the rod guide 15 and the locking section 28 to which the outer tube 3 is swaged. Here, in the sealing member 16, the seal lip 275 is disposed between the large diameter annular convex section 259 of the rod guide 15 and the outer tube 3 and comes in sealing contact therewith. In addition, the oil lip 273 is disposed in the large diameter hole section 254 of the rod guide 15.

Then, the main shaft section 41 of the piston rod 8 is inserted into the dust lip 272 and the oil lip 273 at the sealing member 16 mounted on the cylinder 4. In this state, one end of the piston rod 8 protrudes from one end of the cylinder 4. In addition, in this state, the dust lip 272 is installed at one end side from which the piston rod 8 of the cylinder 4 protrudes, and the oil lip 273 is installed inside in the cylinder inward/outward direction of the dust lip 272.

The spring 268 fitted into the annular groove 278 of the dust lip 272 holds a clamping force of the dust lip 272 toward the piston rod 8 in an adhering direction in a constant state. In addition, the spring 268 is used to adjust the clamping force to satisfy design specification. The spring 269 fitted into the annular groove 279 of the oil lip 273 adjusts the clamping force of the oil lip 273 toward the piston rod 8 in the adhering direction.

The check lip 276 of the rod guide 15 side of the seal section 265 can come in sealing contact with the entire circumference with a predetermined interference at the outer circumferential side of the small diameter annular convex section 258 of the rod guide 15. Here, the oil leaked from the gap between the rod guide 15 and the piston rod 8 remains in a chamber 285 formed mainly by the large diameter hole section 254 closer to the gap side than the check lip 276 of the sealing member 16. The check lip 276 is opened when the pressure of the chamber 285 is higher than that of the reservoir chamber 5 by a predetermined level, so that the oil remaining in the chamber 285 flows to the reservoir chamber 5 via the communication hole 261. That is, the check lip 276 functions as a check valve configured to allow circulation of the oil and gas only in a direction from the chamber 285 to the reservoir chamber 5 and restrict circulation in a reverse direction.

The dust lip 272 of the sealing member 16 is adhered to the piston rod 8 with the interference thereof and a strained force by the spring 268 to hold air tightness. In addition, the dust lip 272 of the sealing member 16 mainly restricts introduction of foreign substances adhered to the piston rod 8 upon exposure to the outside. The oil lip 273 of the sealing member 16 is adhered to the piston rod 8 with the interference and the strained force by the spring 269 to hold air tightness. In addition, the oil lip 273 of the sealing member 16 mainly restricts leakage of the oil adhered to the piston rod 8 upon introduction into the inner tube 2 of the piston rod 8 to the outside due to the exposure to the outside of the piston rod 8.

The friction member 17 is fitted into the intermediate diameter hole section 255 of the rod guide 15, and thus disposed inside the cylinder 4 more than the sealing member 16. The friction member 17 comes in press contact with the outer circumferential section of the main shaft section 41 of the piston rod 8 in the inner circumferential section thereof, and generates a frictional resistance to the piston rod 8.

The friction member 17 is an integrally formed body constituted by an annular elastic rubber section 291 and an annular base section 292. The elastic rubber section 291 is formed of an elastic rubber material such as a nitrile rubber or a fluororubber, and fixed to the base section 292. The base section 292 is a member formed of a metal material to maintain a shape of the elastic rubber section 291 and to obtain strength for fixing. In addition, in FIG. 3, the friction member 17 is shown in a natural state before the piston rod 8 is inserted (not dug into the piston rod 8).

Figure 5:
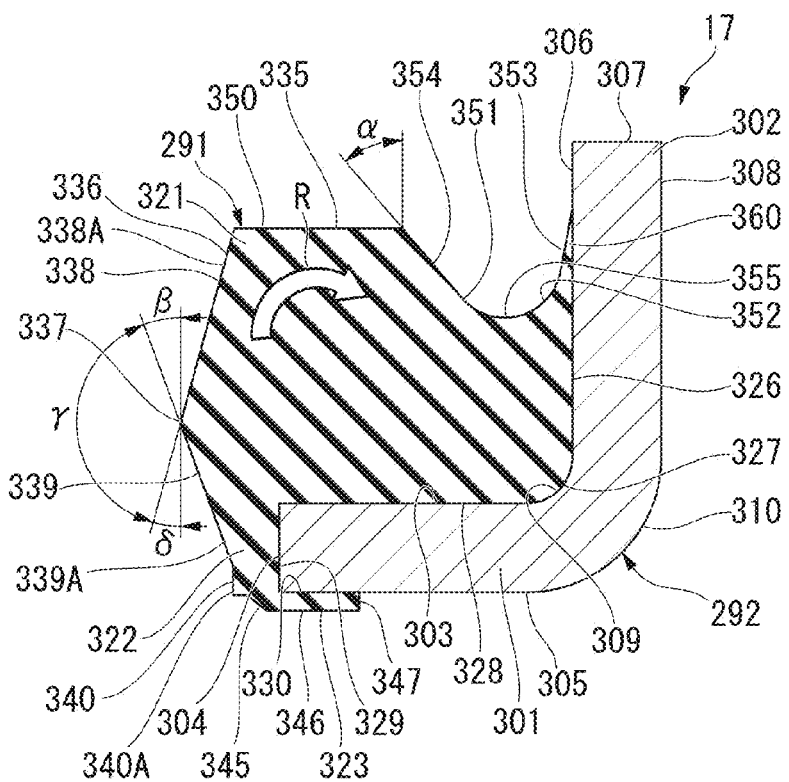
FIG. 5 is one side cross-sectional view showing a friction member of the shock absorber according to the embodiment of the present invention.

As shown in a cross-sectional view of one side in FIG. 5, in the friction member 17, the base section 292 is constituted by a bottom section 301 and a tube section 302. The bottom section 301 has a bored disk shape, and the tube section 302 has a cylindrical shape extending from an outer circumferential side of the bottom section 301 in the axial direction. The bottom section 301 and the tube section 302 coincide with a central axis. In other words, the tube section 302 extends perpendicular to the bottom section 301.

The bottom section 301 has an inner bottom surface 303, an inner end surface 304 and an outer bottom surface 305. The inner bottom surface 303 is constituted by a circular planar surface and is disposed at the tube section 302 side in the axial direction. The inner end surface 304 is constituted by a cylindrical surface and is disposed at an opposite side of the tube section 302 in the radial direction. The outer bottom surface 305 is constituted by a circular planar surface and is disposed at an opposite side of the tube section 302 in the axial direction. An inner circumferential end section of the inner bottom surface 303 is connected to one end section in the axial direction of the inner end surface 304, and an inner circumferential end section of the outer bottom surface 305 is connected to the other end section in the axial direction of the inner end surface 304.

The tube section 302 has an inner circumferential section 306, a tip surface 307 and an outer circumferential surface 308. The inner circumferential section 306 is constituted by a cylindrical surface and is disposed at the bottom section 301 side in the radial direction. The tip surface 307 is constituted by a circular planar surface and is disposed at an opposite side of the bottom section 301 in the axial direction. The outer circumferential surface 308 is constituted by a cylindrical surface and is disposed at an opposite side of the bottom section 301 in the radial direction. An end section of the inner circumferential section 306 opposite to the bottom section 301 is connected to an inner diameter section of the tip surface 307, and an end section of the outer circumferential surface 308 opposite to the bottom section 301 is connected to an outer diameter section of the tip surface 307. An annular inner R chamfer 309 is formed at an approaching side of the inner bottom surface 303 and the inner circumferential section 306, and an annular outer R chamfer 310 is formed at an approaching side of the outer bottom surface 305 and the outer circumferential surface 308.

The elastic rubber section 291 has an annular shape in which the base section 292 coincides with a central axis, and has a main section 321, an intermediate section 322 and a coating section 323. The main section 321 is formed inside in the radial direction of the tube section 302 of the base section 292 and at the tube section 302 side in the axial direction of the bottom section 301. The intermediate section 322 extends from the end section of the bottom section 301 side in the axial direction of the inner circumferential section of the main section 321 outward in the axial direction, and is formed at the inner circumferential side of the bottom section 301. The coating section 323 extends from an opposite side of the main section 321 outward in the axial direction of the intermediate section 322, and covers a portion of the inner circumferential side of the outer bottom surface 305 of the bottom section 301.

The main section 321 is fixed to the inner circumferential section 306 of the tube section 302 of the base section 292 at a tube section adhering surface 326 of the outer circumferential side. In addition, the main section 321 is fixed to the inner R chamfer 309 of the base section 292 at a corner adhering surface 327 connected to one side in the axial direction of the tube section adhering surface 326. Further, the main section 321 is fixed to the inner bottom surface 303 of the bottom section 301 of the base section 292 at a bottom section adhering surface 328 connected to the corner adhering surface 327 opposite to the tube section adhering surface 326. The intermediate section 322 is fixed to the inner end surface 304 of the bottom section 301 of the base section 292 at an inner circumference adhering surface 329 connected to the bottom section adhering surface 328 opposite to the corner adhering surface 327. The coating section 323 is fixed to the outer bottom surface 305 of the bottom section 301 of the base section 292 at an outer surface adhering surface 330 connected to the inner circumference adhering surface 329.

The elastic rubber section 291 has an open surface 335 in an opposite side in the axial direction of the bottom section adhering surface 328 of the main section 321. The open surface 335 is a surface that is not fixed to the base section 292 but can be elastically deformed. In addition, the elastic rubber section 291 has an inner circumferential section 336 disposed at the inner circumferential sides of the main section 321 and the intermediate section 322. The inner circumferential section 336 is also a surface that is not fixed to the base section 292 but can be elastically deformed.

The inner circumferential section of the elastic rubber section 291 has a minimum inner diameter section 337, a diameter expanding section 338, a diameter expanding section 339 and a diameter constant section 340. The minimum inner diameter section 337 has the smallest diameter in the friction member 17. The diameter expanding section 338 is disposed at one side in the axial direction of the minimum inner diameter section 337 and has a tapered shape having a diameter that increases away from the minimum inner diameter section 337. The diameter expanding section 339 is disposed at the other side in the axial direction of the minimum inner diameter section 337 and has a tapered shape having a diameter that increases away from the minimum inner diameter section 337. The diameter constant section 340 has a constant diameter, and is connected to the diameter expanding section 339 opposite to the minimum inner diameter section 337 of an opposite side of the open surface 335 in the axial direction. In other words, the minimum inner diameter section 337, the diameter expanding sections 338 and 339 of both sides in the axial direction of the minimum inner diameter section 337 and the diameter constant section 340 are formed at the inner circumferential side of the elastic rubber section 291. A boundary portion of the diameter expanding sections 338 and 339 configures the minimum inner diameter section 337 in the elastic rubber section 291.

Accordingly, the inner circumferential section 336 of the elastic rubber section 291 is constituted by an inner circumferential surface 338A having a tapered surface shape of the diameter expanding section 338, an inner circumferential surface 339A having a tapered surface shape of the diameter expanding section 339, and an inner circumferential surface 340A having a cylindrical surface shape of the diameter constant section 340. An end section of the inner circumferential surface 338A of the one diameter expanding section 338 opposite to the minimum inner diameter section 337 is connected to the open surface 335. An end section of the inner circumferential surface 339A of the other diameter expanding section 339 opposite to the minimum inner diameter section 337 is connected to the inner circumferential surface 340A of the diameter constant section 340.

The minimum inner diameter section 337 is formed at the main section 321, and a position in the axial direction of the minimum inner diameter section 337 overlaps the tube section 302 of the base section 292. In other words, the position in the axial direction of the minimum inner diameter section 337 is deviated from the bottom section 301 of the base section 292.

The coating section 323 has a chamfer 345, an outer surface 346 and an outer circumferential surface 347. The chamfer 345 is connected to the end section of the inner circumferential surface 340A of the diameter constant section 340 opposite to the diameter expanding section 339, and has a tapered shape having a diameter that increases away from the diameter constant section 340 in the axial direction. The outer surface 346 extends from the end section of the chamfer 345 opposite to the diameter constant section 340 inward in the radial direction, and is constituted by a circular planar surface. The outer circumferential surface 347 forms a cylindrical surface shape disposed at the outer surface 346 opposite to the chamfer 345. That is, as the elastic rubber section 291 is provided with the intermediate section 322 and the coating section 323, the elastic rubber section 291 has a shape surrounding a portion of the bottom section 301 of the base section 292 to an opposite side of the main section 321.

As described above, a central axis of the elastic rubber section 291 coincides with a central axis of the base section 292, specifically, central axes of the open surface 335, the minimum inner diameter section 337, the diameter expanding sections 338 and 339 including the inner circumferential surfaces 338A and 339A, the diameter constant section 340 including the inner circumferential surface 340A, the chamfer 345, the outer surface 346, and the outer circumferential surface 347 coincide with the central axis of the base section 292. The central axis is a central axis of the friction member 17.

A cutout section 351 is formed in the elastic rubber section 291 at the tube section 302 side of the open surface 335 of the main section 321, i.e., outside in the radial direction. The cutout section 351 is formed to be concaved within a range in which the cutout section 351 is formed closer to the bottom section 301 in the axial direction than a main surface section 350 of the open surface 335 except for the cutout section 351 and does not reach to the bottom section 301. The main surface section 350 inside in the radial direction of the open surface 335 has an annular shape about the central axis of the friction member 17. The main surface section 350 has a circular planar surface disposed in a surface perpendicular to the central axis of the friction member 17. The cutout section 351 has an annular shape continued to the entire circumference in the circumferential direction of the friction member 17 about the central axis of the friction member 17, and is formed to overlap positions of the tube section 302 side of the bottom section 301 and the inner R chamfer 309 in the radial direction.

The cutout section 351 is formed to have a depth smaller than a half of a depth in the axial direction of the main section 321. The cutout section 351 has a concave bottom surface 352, an outward extending surface 353 and an inward extending surface 354. The concave bottom surface 352 has an arc shape having a cross section including a centerline of the friction member 17, and is concaved to the bottom section 301 side in the axial direction. The outward extending surface 353 has a tapered shape extending from the end section outside in the radial direction of the concave bottom surface 352 to an opposite side of the bottom section 301 in the axial direction so as to have a diameter that increases away from the bottom section 301. The inward extending surface 354 has a tapered shape extending from the end section inside in the radial direction of the concave bottom surface 352 to an opposite side of the bottom section 301 in the axial direction so as to have a diameter that decreases away from the bottom section 301. The cutout section 351 has a deepest section 355 which has a largest depth disposed at the end section of the bottom section 301 side in the axial direction of the concave bottom surface 352, i.e., at which a bottom position. The concave bottom surface 352, the outward extending surface 353 and the inward extending surface 354 are also formed about the central axis of the friction member 17, and the deepest section 355 also has a circular shape about the central axis of the friction member 17.

The main section 321 of the elastic rubber section 291 has an extending section 360 formed at the tube section 302 side of the cutout section 351. The extending section 360 extends to a position shallower than the deepest section 355 of the cutout section 351 in the axial direction. An inner circumferential section of the extending section 360 is constituted by an outer section in a radial direction of the deepest section 355 of the concave bottom surface 352 and the outward extending surface 353, and an outer circumferential surface is constituted by the tube section adhering surface 326. A tip position in the axial direction of the extending section 360 coincides with the main surface section 350, and is disposed closer to the bottom section 301 than the tip surface 307 of the tube section 302 of the base section 292 by a predetermined amount. In other words, the inner circumferential section 306 of the tube section 302 of the base section 292 is covered with the elastic rubber section 291 including the extending section 360, except for a portion thereof near the tip surface 307.

A depth of the deepest section 355 of the cutout section 351 is smaller than that of the position in the axial direction of the minimum inner diameter section 337. That is, the deepest section 355 is positioned at an opposite side of the bottom section 301 with respect to the minimum inner diameter section 337 in the axial direction of the friction member 17, and overlaps the diameter expanding section 338, which is opposite to the bottom section 301 of the diameter expanding sections 338 and 339.

The elastic rubber section 291 is formed such that an angle α of the inward extending surface 354 inside in the radial direction of the cutout section 351 with respect to the centerline of the friction member 17 is larger than an angle β of the inner circumferential section 339A of the diameter expanding section 339, which is the bottom section adhering surface 328 side of the diameter expanding sections 338 and 339. In other words, an extension surface of the inner circumferential surface 339A of the diameter expanding section 339 of the bottom section adhering surface 328 side opposite to the bottom section 301, and the inward extending surface 354 inside in the radial direction of the cutout section 351 approach in the radial direction away from the bottom section adhering surface 328 in the axial direction. The elastic rubber section 291 is configured such that an angle γ formed between the inner circumferential surface 338A of the diameter expanding section 338 and the inner circumferential surface 339A of the diameter expanding section 339 is 120° or more, and an angle β of the inner circumferential surface 339A with respect to a direction of the centerline of the friction member 17 is larger than an angle θ of the inner circumferential surface 338A.

As shown in FIG. 3, in a state in which the open surface 335 of the elastic rubber section 291 is disposed outside in the cylinder inward/outward direction and the bottom section 301 of the base section 292 is disposed inside in the cylinder inward/outward direction, the friction member 17 having the above-mentioned structure is fitted into the intermediate diameter hole section 255 from the large diameter hole section 254 side of the rod guide 15. Here, in the friction member 17, the tube section 302 of the base section 292 is fitted into the inner circumferential section of the intermediate diameter hole section 255, and the bottom section 301 abuts a bottom surface of the intermediate diameter hole section 255 while deforming the coating section 323 of the elastic rubber section 291.

Then, in the friction member 17 attached to the cylinder 4, the main shaft section 41 of the piston rod 8 is inserted into the elastic rubber section 291 with a predetermined interference. Accordingly, in the friction member 17, the elastic rubber section 291 is elastically deformed outward in the radial direction and adhered to the main shaft section 41 of the piston rod 8. Then, when the piston rod 8 moves in the cylinder inward/outward direction, the elastic rubber section 291 comes in sliding contact therewith. Here, the friction member 17 adjusts frictional properties.

A communication passage 361 is formed between the intermediate diameter hole section 255 of the rod guide 15 and the friction member 17 by the communication groove 257 formed in the intermediate diameter hole section 255 in a state in which the friction member 17 is fitted as described above. The communication passage 361 is in communication with the small diameter hole section 256 side and the large diameter hole section 254 side, i.e., the chamber 285 side, of the rod guide 15. The small diameter hole section 256 side of the rod guide 15 is in communication with the chamber 11 via a micro gap between the collar 251 and the piston rod 8. Accordingly, the communication passage 361 brings the chamber 285 in communication with the chamber 11 to reduce a pressure difference therebetween. In other words, the communication passage 361 brings both sides in the axial direction of the friction member 17 in communication with each other to reduce a pressure difference between both sides in the axial direction of the friction member 17. Accordingly, the friction member 17 does not positively function as a seal. The friction member 17 and the communication passage 361 constitute a damping force generation mechanism 370 (a second damping force generation mechanism) configured to generate a damping force to the shock absorber 1 by providing a sliding resistance of the piston rod 8 due to the friction member 17.

In addition, instead of the communication passage 361, or in addition to the communication passage 361, a communication passage configured to reduce a pressure difference between both sides in the axial direction may be formed at an inner circumference of the friction member 17. Further, even if the communication passage 361 is not always in a communication state, for example, check valves may be installed at both sides in the axial direction of the friction member 17. In other words, the friction member 17 may not be operated as a perfect seal.

Next, an operation of the above-mentioned shock absorber 1 will be described.

First, operations of the damping force generation mechanisms 51a and 51h installed at the piston 9 and the damping force varying mechanism 58 installed at the piston rod 8, and properties of the shock absorber 1 generated thereby will be described with reference mainly to FIG. 2.

In the extension stroke in which the piston rod 8 is moved toward the extension side, the oil flows from the chamber 11 to the chamber 12 via the passage 50a. When a piston speed is within a very low speed range, the oil introduced into the passage 50a from the chamber 11 basically flows to the chamber 12 via the fixed orifice 78a, which is always open, formed between the seat section 71a and the disk 75a abutting the seat section 71a, and here, generates a damping force of orifice properties (the damping force is substantially in proportion to a square of the piston speed). In addition, when the piston speed is increased to arrive at a low speed range, the oil introduced into the passage 50a from the chamber 11 basically flows between the disk 75a and the seat section 71a to the chamber 12 while opening the disk 75a. For this reason, a damping force of valve properties is generated (the damping force is substantially in proportion to the piston speed).

In the compression stroke in which the piston rod 8 is moved toward the compression side, the oil flows to the chamber 11 from the chamber 12 via the passage 50b. When the piston speed is within a very low speed range, the oil introduced into the passage 50b from the chamber 12 basically flows to the chamber 11 via the fixed orifice 78b, which is always open, formed between the seat section 71b and the disk 75b abutting the seat section 71b, and here, generates a damping force of orifice properties (the damping force is substantially in proportion to a square of the piston speed). In addition, when the piston speed is increased to arrive at the low speed range, the oil introduced into the passage 50b from the chamber 12 basically flows to the chamber 11 through between the disk 75b and the seat section 71b while opening the disk 75b. For this reason, a damping force of valve properties is generated (the damping force is substantially in proportion to the piston speed).

Figure 6:
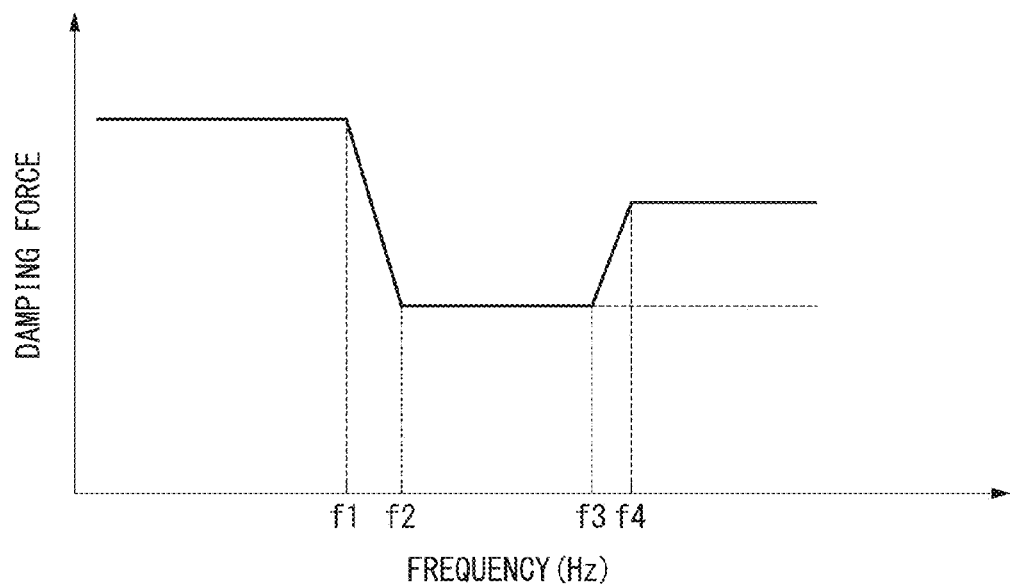
FIG. 6 is a property diagram schematically showing a relationship between a frequency and a damping force when a piston speed of the shock absorber according to the embodiment of the present invention is constant.

Here, a region in which a frequency when the piston speed is low, i.e., a region in which a very low speed range (for example, 0.05 m/s) is a relatively high frequency (for example, 7 Hz or more), is, for example, due to vibrations generated from a fine unevenness of a road surface, and it is preferable to decrease the damping force in such a circumstance. In addition, even when the piston speed is similarly low, conversely, a region in which the frequency is relatively low (for example, 2 Hz or less) is due to vibrations such as shaking due to rolling of a vehicle body, and it is preferable to increase the damping force in such a circumstance. FIG. 6 shows properties when the piston speed, i.e., the excitation speed of the shock absorber 1, is 0.05 m/s.

Corresponding to the above, the damping force varying mechanism 58 varies a damping force in response to the frequency even when the piston speed is similarly low. That is, when the piston speed is low, if a reciprocating frequency of the piston 9 is increased, in the extension stroke, the pressure of the chamber 11 is increased, and the free piston 87 is moved toward the chamber 12 in the axial direction with respect to the housing 85 against a biasing force of the O-ring 89 disposed at the chamber 12 side in the axial direction while introducing the oil from the chamber 11 into the rod chamber-side passage section 123 of the housing-inside passage 121 of the damping force varying mechanism 58 via the rod-inside passage 57 of the piston rod 8. As the free piston 87 is moved toward the chamber 12 side in the axial direction as described above, the oil is introduced into the housing-inside passage 121 from the chamber 11, and a flow rate of the oil introduced into the passage 50a from the chamber 11, passing through the damping force generation mechanism 51a, and flowing into the chamber 12, is reduced. Accordingly, as shown in a region of FIG. 6 in which the frequency is f2 (for example, 5 Hz) or more, the damping force is decreased.

Next, in the compression stroke, since the pressure of the chamber 12 is increased, while the oil is discharged to the chamber 11 from the rod chamber-side passage section 123 of the housing-inside passage 121 of the damping force varying mechanism 58 via the rod-inside passage 57 of the piston rod 8, the free piston 87 moved toward the chamber 12 side in the axial direction is moved toward the chamber 11 in the axial direction with respect to the housing 85 against the biasing force of the O-ring 88 disposed at the chamber 11 side in the axial direction. As the free piston 87 is moved toward the chamber 11 in the axial direction as described above, a capacity of the chamber 12 is increased, and a flow rate of the oil introduced into the passage 50b from the chamber 12 and passing through the damping force generation mechanism 51b and flowing into the chamber 11 is reduced. Accordingly, the damping force is decreased.

In the region in which the frequency of the piston 9 is high, a moving frequency of the free piston 87 is also accordingly increased. As a result, during the extension stroke, the oil flows from the chamber 11 to the rod chamber-side passage section 123 of the housing-inside passage 121, and during the compression stroke, a capacity of the chamber 12 is increased by a movement amount of the free piston 87, and for example, the damping force is maintained in a decreased state as shown in a broken line at a region of FIG. 6 in which the frequency is f3 (for example, 10 Hz) or more.

Meanwhile, when the piston speed is low, if the frequency of the piston 9 is decreased, the moving frequency of the free piston 87 is also accordingly decreased. For this reason, at the beginning of the extension stroke, while the oil flows from the chamber 11 to the rod chamber-side passage section 123 of the housing-inside passage 121, after that, since the free piston 87 compresses the O-ring 89 to be stopped at the chamber 12 side in the axial direction with respect to the housing 85 and the oil does not flow from the chamber 11 to the rod chamber-side passage section 123 of the housing-inside passage 121, a flow rate of the oil introduced into the passage 50a from the chamber 11 and passing through the damping force generation mechanism 51a and flowing in the chamber 12 is not reduced, and for example, the damping force is increased as shown in a region of FIG. 6 in which the frequency is f1 (for example, 2 Hz) or less.

Next, even in the compression stroke, at the beginning thereof, while the capacity of the chamber 12 is increased by a movement amount of the free piston 87 with respect to the housing 85, after that, since the free piston 87 compresses the O-ring 88 to be stopped at the chamber 11 side in the axial direction with respect to the housing 85 and does not exert an influence on the capacity of the chamber 12, a flow rate of the oil introduced into the passage 50b from the chamber 12 and passing through the damping force generation mechanism 51b and flowing in the chamber 11 is not reduced, and the damping force is increased.

When the piston 9 is stopped and the pressures of the chamber 11 and the chamber 12 become equal, the free piston 87 is disposed at a neutral position shown in FIG. 2 by an elastic force of the O-rings 88 and 89 formed of a rubber material. When the free piston 87 is disposed at the neutral position as described above, the O-ring 88 comes in contact with the large diameter cylindrical surface section 103 and the inclined surface section 97 of the housing 85 and the small diameter cylindrical surface section 117 and the inclined surface section 116 of the free piston 87, and the O-ring 89 comes in contact with the large diameter cylindrical surface section 103 and the inclined surface section 102 of the housing 85 and the small diameter cylindrical surface section 113 and the inclined surface section 114 of the free piston 87. Accordingly, the O-rings 88 and 89 press the free piston 87 in opposite directions.

When the free piston 87 is in the neutral position, the small diameter cylindrical surface section 101 of the inner annular protrusion 100 of the housing 85 and the tapered surface section 112 and the small diameter cylindrical surface section 113 of the free piston 87 overlap at a position in the axial direction and oppose each other in the radial direction. Here, a gap 131 between the small diameter cylindrical surface section 101, the tapered surface section 112 and the small diameter cylindrical surface section 113 provides a cross-sectional area A1 in the radial direction obtained by subtracting an area of a circle having an outer diameter of the small diameter cylindrical surface section 113 as a diameter from an area of a circle having an inner diameter of the small diameter cylindrical surface section 101 as a diameter.

In addition, when the free piston 87 is moved from the neutral position to an opposite side of the cover member 82, as a position in the axial direction of the tapered surface section 112 of the free piston 87 is deviated with respect to the small diameter cylindrical surface section 101 of the housing 85, the position in the axial direction of the small diameter cylindrical surface section 101 of the housing 85 overlaps only the small diameter cylindrical surface section 113 of the free piston 87 to oppose each other in the radial direction. Accordingly, the cross-sectional area A1 in the radial direction is constantly maintained similar to the neutral state. Meanwhile, when the free piston 87 is moved from the neutral position toward the cover member 82, a position in the axial direction of the small diameter cylindrical surface section 113 of the free piston 87 is deviated with respect to the small diameter cylindrical surface section 101 of the housing 85. Then, the position in the axial direction of the small diameter cylindrical surface section 101 of the housing 85 overlaps only the tapered surface section 112 of the free piston 87 to oppose each other in the radial direction, finally not opposing the free piston 87 in the radial direction. Accordingly, the cross-sectional area A1 in the radial direction is gradually increased in comparison with the neutral state, and then expanded at once.

When the free piston 87 is in the neutral position, the large diameter cylindrical surface section 103 of the housing 85 and the large diameter cylindrical surface section 115 of the outer annular protrusion 110 of the free piston 87 overlap at a position in the axial direction to oppose each other in the radial direction. Here, a gap 132 between the large diameter cylindrical surface section 103 and the large diameter cylindrical surface section 115 provides a cross-sectional area A2 in the radial direction obtained by subtracting an area of a circle having an outer diameter of the large diameter cylindrical surface section 115 as a diameter from an area of a circle having an inner diameter of the large diameter cylindrical surface section 103 as a diameter.

In addition, even when the free piston 87 is moved from the neutral position in any axial direction, the large diameter cylindrical surface section 103 of the housing 85 and the large diameter cylindrical surface section 115 of the free piston 87 overlap at the position in the axial direction to oppose each other in the radial direction. Accordingly, the cross-sectional area A2 in the radial direction is always constantly maintained.

When the free piston 87 is in the neutral position, the cylindrical surface section 96 of the cover outer tube section 93 of the housing 85 and the tapered surface section 118 of the free piston 87 overlap at the position in the axial direction to oppose each other in the radial direction. Here, a gap 133 between the cylindrical surface section 96 and the tapered surface section 118 provides a cross-sectional area A3 in the radial direction obtained by subtracting an area of a circle having an outer diameter of a portion of the tapered surface section 118 in which the end section of the inclined surface section 97 side of the cylindrical surface section 96 meets the position in the axial direction as a diameter from an area of a circle having an inner diameter of the cylindrical surface section 96 as a diameter.

In addition, when the free piston 87 is moved from the neutral position to an opposite side of the cover member 82, the position in the axial direction of the tapered surface section 118 of the free piston 87 is gradually deviated with respect to the cylindrical surface section 96 of the housing 85, and finally, the cylindrical surface section 96 of the housing 85 does not overlap the free piston 87 at the position in the axial direction. Accordingly, the cross-sectional area A3 in the radial direction is gradually increased in comparison with the neutral state, and then expanded at once. Meanwhile, when the free piston 87 is moved from the neutral position toward the cover member 82, the position in the axial direction of the tapered surface section 118 of the free piston 87 is gradually deviated with respect to the cylindrical surface section 96 of the housing 85, and finally overlaps the small diameter cylindrical surface section 117 of the free piston 87 at the position in the axial direction to oppose each other in the radial direction. Accordingly, the cross-sectional area A3 in the radial direction is gradually reduced in comparison with the neutral state, and then becomes constant.

Then, in the embodiment, in a state in which the free piston 87 is in the neutral position, the gap 131, the gap 132 and the gap 133 have the radial direction cross-sectional areas such that the cross-sectional area A1 in the radial direction of the gap 131 is smaller than the cross-sectional area A2 in the radial direction of the gap 132 and the cross-sectional area A3 in the radial direction of the gap 133. That is, the cross-sectional area A1 in the radial direction<the cross-sectional area A2 in the radial direction, and the cross-sectional area A1 in the radial direction<the cross-sectional area A3 in the radial direction. More specifically, the cross-sectional area A1 in the radial direction<the cross-sectional area A2 in the radial direction<the cross-sectional area A3 in the radial direction. In other words, in a state in which the free piston 87 is in the neutral position, a minimum value in the radial direction of the gap 131 is reduced to be smaller than a minimum value in the radial direction of the gap 132 and a minimum value in the radial direction of the gap 133, and the minimum value in the radial direction of the gap 132 is smaller than the minimum value in the radial direction of the gap 133. Further, in other words, in a state in which the free piston 87 is in the neutral position, the gap 131 becomes a portion having a smallest gap in the radial direction, the gap 132 becomes a portion having the next smaller gap in the radial direction, and the gap 133 becomes a portion having the next smaller gap in the radial direction.

The gap 132 between the large diameter cylindrical surface section 103 of the housing 85 and the large diameter cylindrical surface section 115 of the outer annular protrusion 110 of the free piston 87 is set to decrease a pressure loss at an outlet outside the passage hole 119. Accordingly, even when a pressure change occurs in an upper chamber 6, pressures of the chamber 125 inside the free piston 87 and the chamber 126 outside the free piston 87 can be equalized. Accordingly, behavioral stability of the free piston 87 and the O-ring 88 can be planned for.

When the free piston 87 is moved toward an opposite side of the cover member 82 with respect to the housing 85 as a level of the oil in the upper chamber 6 is increased in the extension stroke, the gap 131 between the small diameter cylindrical surface section 101 of the housing 85 and the small diameter cylindrical surface section 113 of the free piston 87 becomes a portion having a smallest gap in the radial direction of the gaps 131 to 133, and the cross-sectional area A1 in the radial direction is obtained by subtracting an area of a circle having an outer diameter of the small diameter cylindrical surface section 113 as a diameter from an area of a circle having an inner diameter of the small diameter cylindrical surface section 101 as a diameter. In this state, as the small diameter cylindrical surface section 101 abuts the small diameter cylindrical surface section 113, relative movement in the radial direction of the free piston 87 with respect to the housing 85 is restricted. In addition, even when the O-ring 89 disposed between the chamber 126 of the rod chamber-side passage section 123 and the bottom chamber-side passage section 124 and configured to generate a pressure difference in a direction moving toward the gap 131 in the extension stroke is further moved toward the gap 131 by the pressure difference in addition to compression by the outer annular protrusion 110 of the free piston 87, since the cross-sectional area A1 in the radial direction of the gap 131 between the small diameter cylindrical surface section 101 and the small diameter cylindrical surface section 113 is small, generation of "digging" sandwiched in the gap 131 can be suppressed. Accordingly, reliability can be maintained.

In addition, when the free piston 87 is moved toward the cover member 82 with respect to the housing 85 as a level of the oil in a lower chamber 7 is increased in the compression stroke, as the small diameter cylindrical surface section 101 of the housing 85 and the small diameter cylindrical surface section 113 of the free piston 87 are deviated in the axial direction, the gap 132 between the large diameter cylindrical surface section 103 of the housing 85 and the large diameter cylindrical surface section 115 of the free piston 87 becomes a portion having a smallest gap in the radial direction of the gaps 131 to 133, and the cross-sectional area A2 in the radial direction is obtained by subtracting an area of a circle having an outer diameter of the large diameter cylindrical surface section 115 as a diameter from an area of a circle having an inner diameter of the large diameter cylindrical surface section 103 as a diameter. In this state, as the large diameter cylindrical surface section 103 abuts the large diameter cylindrical surface section 115, relative movement in the radial direction of the free piston 87 with respect to the housing 85 is restricted. Here, while a pressure difference in a direction moving toward the gap 132, which is a reverse direction of the above-mentioned direction, is generated at the O-ring 89, since a force received from the free piston 87 is small, a movement of the O-ring 89 toward the gap 132 is suppressed and although the cross-sectional area A2 in the radial direction of the gap 132 is slightly wide, generation of "digging" is suppressed. Accordingly, reliability can be maintained.

In addition, in a state in which the piston 9 is stopped and the free piston 87 is in the neutral position, the gaps 131 to 133 are set such that the cross-sectional area A1 in the radial direction of the gap 131 is smaller than the cross-sectional area A2 in the radial direction of the gap 132 and the cross-sectional area A3 in the radial direction of the gap 133. As described above, as a magnitude correlation is provided to the cross-sectional areas A1 to A3 in the radial direction of the gaps 131 to 133, concentricity of the tapered surface section 112, the small diameter cylindrical surface section 113, the large diameter cylindrical surface section 115, the small diameter cylindrical surface section 117 and the tapered surface section 118 forming the gaps 131 to 133 of the free piston 87 can be attenuated.

Accordingly, productivity can be improved while maintaining reliability.

Here, in properties of the shock absorber 1 generated by the damping force generation mechanisms 51a and 51b and the damping force varying mechanism 58, as shown in FIG. 6, while the damping force is decreased when the frequency is increased to f2 (for example, 5 Hz) or more, if a damping force of about 15 Hz (13 to 17 Hz), which is a resonance frequency of unsprung mass of the vehicle V, is low, vibrations of unsprung mass of the vehicle V are increased and a damping property of unsprung mass is deteriorated. For this reason, riding comfort is also deteriorated. In addition, when the damping force is too low in a soft setting, an initial application of the damping force is deteriorated even in a state in which the frequency is low, and responsiveness of handling is deteriorated. These problems are similarly generated even in the shock absorber disclosed in Japanese Unexamined Patent Application, First Publication No. 2011-202800.

On the other hand, in the embodiment 1, the damping force generation mechanism 370 having the friction member 17 and the communication passage 361 shown in FIG. 3 is provided, and an acting force to the piston rod 8 upon input of a slight amplitude at which the piston speed is a very low speed is appropriately adjusted by the friction member 17. That is, when the friction member 17 is used, upon input of the slight amplitude at which the piston speed is a very low speed, in a frictional region in which the piston speed starts from 0, the friction member 17 generates a spring force by elastic deformation of the elastic rubber section 291 without generating sliding with the piston rod 8, and the spring force becomes the acting force (a dynamic spring region). After that, when the piston rod 8 moves to a certain extent (0.1 mm) or more, sliding occurs between the friction member 17 and the piston rod 8, and a dynamic frictional force occurs (a dynamic frictional region). In the embodiment, a dynamic spring constant upon the slight amplitude can be improved by the friction member 17 to increase a dynamic frictional coefficient, and the damping force at a region in which the frequency is high can be increased to be larger than the damping force by the damping force generation mechanisms 51a and 51b and the damping force varying mechanism 58. That is, compared with a case in which the damping force generation mechanism 370 is not installed shown as a broken line at the region in which the frequency of FIG. 6 is f3 (for example, 10 Hz) or more, the damping force is high in a case in which the damping force generation mechanism 370 is installed shown as a solid line at the region in which the frequency of FIG. 6 is f3 to f4 (for example, 13 Hz) or more, i.e., approaches to a hard side. Accordingly, good damping force properties can be obtained, a damping property of unsprung mass can be improved, and riding comfort can be improved.

When a tire T attached to the wheel W of the vehicle body B shown in FIG. 4 is a run flat tire that can run a predetermined distance even upon generation of a puncture, or is a low fuel consumption tire with a pneumatic pressure of 240 kPa or more, stiffness (a spring constant) of the tire T is increased and vibrations of unsprung mass are increased to deteriorate riding comfort. In particular, as the shock absorber 1 is installed at the vehicle body B including these tires T, an effect of improving a damping property of unsprung mass is increased.

Figure 7:
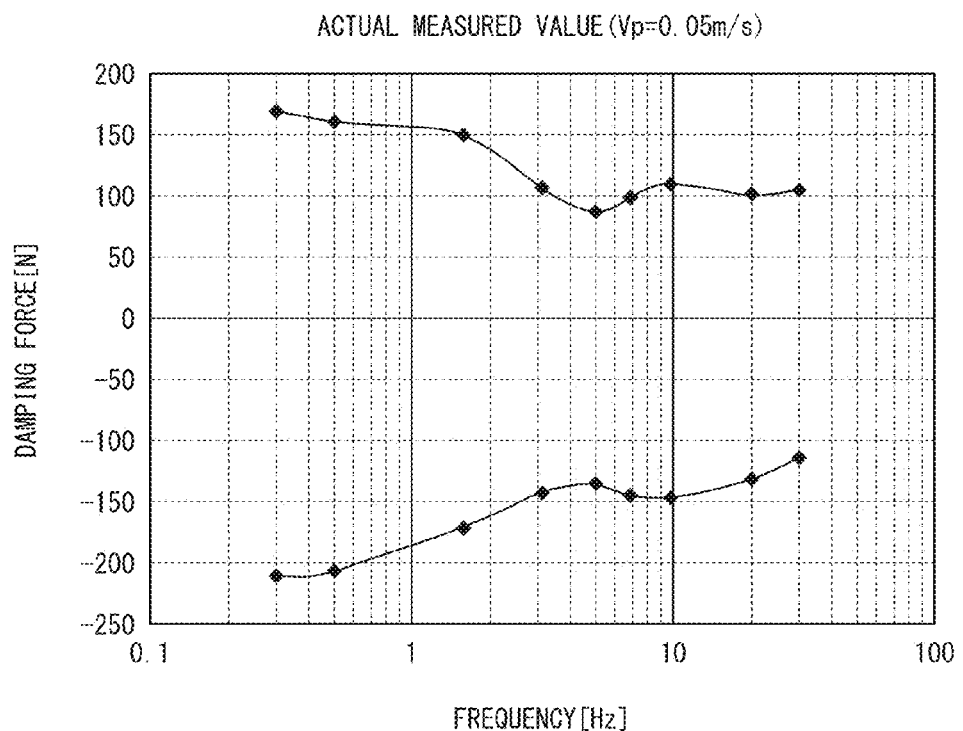
FIG. 7 is a property diagram showing measured values of a relationship between a frequency and a damping force when the piston speed of the shock absorber according to the embodiment of the present invention is constant.

Specifically, according to the shock absorber 1 of the embodiment, measured values of damping force properties at an excitation speed of 0.05 m/s are properties shown in FIG. 7. In the properties, a maximum damping force value becomes a soft side in which the damping force upon the frequency of 10 Hz or more is smaller than that upon the frequency of 1 Hz or less, and becomes a hard side in which the damping force is larger than that upon the frequency of about 5 Hz (specifically 5 Hz).

Figure 8:
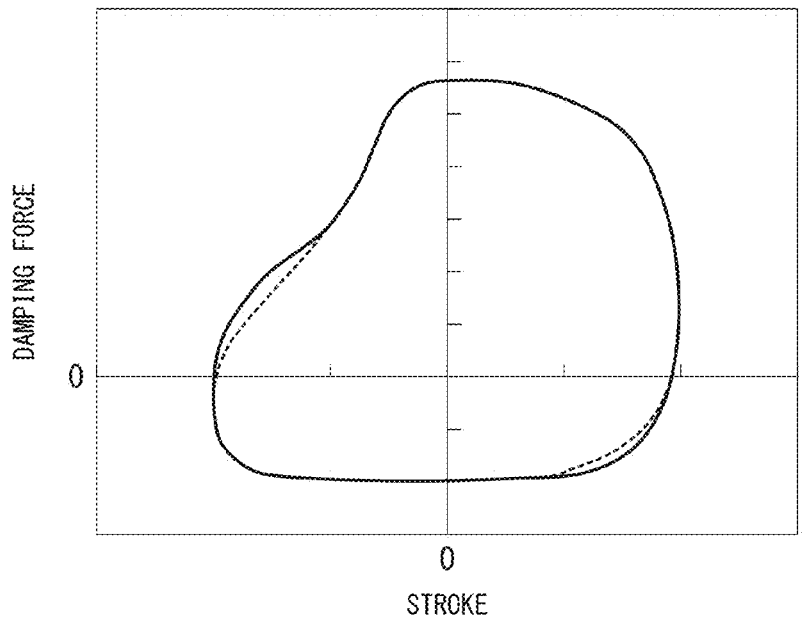
FIG. 8 is a property diagram showing a relationship between a stroke position and a damping force of the shock absorber according to the embodiment of the present invention.

In addition, upon input of the slight amplitude at which the piston speed is a very low speed, since the damping force can be rapidly applied by the friction member 17 of the damping force generation mechanism 370, responsiveness of the handling from a state in which steering is held at the neutral position can be improved. Specifically, in the shock absorber 1, since a Lissajous waveform showing a relation between the stroke and the damping force is shown by a solid line in FIG. 8, a state in which the damping force is high can be maintained in a reverse initial stage upon reverse of a stroke, in comparison with the case in which the damping force generation mechanism 370 is not installed shown by a broken line in FIG. 8.

In a region in which the piston speed is slower with respect to the hydraulic damping region configured to generate a hydraulic damping force by the damping force generation mechanisms 51a and 51b and the damping force varying mechanism 58, basically the damping force by the damping force generation mechanisms 51a and 51b and the damping force varying mechanism 58 is almost never generated. For this reason, an elastic force and a frictional resistance to the piston rod 8 by the sealing member 16 and the friction member 17, which are always generated, and a frictional resistance to the inner tube 2 of the piston 9 become a main source of the damping force. In such a frictional region, an acting force to the piston rod 8 can be appropriately adjusted by setting of the friction member 17.

Figure 10:
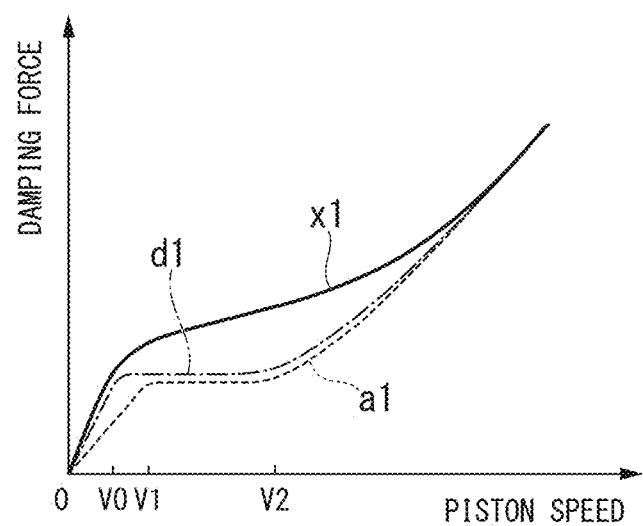
FIG. 10 is a property diagram showing a relationship between a damping force with respect to a piston speed of the shock absorber according to the embodiment of the present invention and the shock absorber using the other friction member.

Japanese Unexamined Patent Application, First Publication No. 2005-325997 discloses a friction member formed through vulcanized adhesion of a frictional body having a gap with a cylindrical section and formed of an elastic rubber material to a metallic annular bottom section having a bottomed cylindrical shape which has a bottom section and a cylindrical section (see FIG. 10 of Japanese Unexamined Patent Application, First Publication No. 2005-325997). In addition, Japanese Unexamined Patent Application, First Publication No. 2003-156093 discloses a friction member, which is different from the above-mentioned friction member, formed by baking of rubber such that a gap with a cylindrical section is not formed in a bottomed cylindrical core bar constituted by a bottom section and the cylindrical section (see FIG. 6(D) of Japanese Unexamined Patent Application, First Publication No, 2003-156093).

In the shock absorber using such a friction member, in the frictional region in which the piston speed starts from 0, the friction member generates a spring force by elastic deformation of rubber without generating sliding with the piston rod, and the spring force becomes an acting force (a dynamic spring region). After that, when the piston rod moves to a certain extent (0.1 mm) or more, sliding occurs between the friction member and the piston rod, and a dynamic frictional force occurs (a dynamic frictional region).

In recent development, as the dynamic spring region in the frictional region is expanded and the dynamic frictional region is reduced, connection to the hydraulic damping region becomes smooth and an inclination of an increase in damping force with respect to an increase in piston speed can be increased. As a result, it will be appreciated that rough vibrations of a radio frequency are suppressed to improve riding comfort, and a force at the beginning or end of roll is generated to further improve handling stability.

However, as disclosed in Japanese Unexamined Patent Application, First Publication No, 2005-325997, when the frictional body is formed to have a gap with the metallic annular cylindrical section, since stiffness of the frictional body is low and the frictional body is rapidly slid with respect to movement of the piston rod 8, the dynamic spring region in the frictional region is reduced, and the dynamic frictional region is increased. For this reason, the damping force is constant until entering the hydraulic damping region, and cannot be smoothly connected to the hydraulic damping force. In addition, an inclination of an increase in damping force with respect to an increase in piston speed in a region in which the piston speed is 0 to a very low speed is small, and an effect of the dynamic spring region is also small. Further, as disclosed in Japanese Unexamined. Patent Application, First Publication No. 2003-156093, when rubber is installed not to form a gap with the cylindrical section of the core bar, as a force of pressing the rubber against the piston rod is increased, an inclination of an increase in damping force with respect to an increase in piston speed in a region in which the piston speed is 0 to a very low speed is increased, but a force to start sliding the frictional body with respect to movement of the piston rod 8 is increased, it is difficult to deform the rubber. As a result, a stroke until sliding is small, the dynamic spring region is not very large, a frictional resistance at the beginning of sliding is abruptly decreased, and the damping force becomes constant until entering the hydraulic damping region and cannot be smoothly connected to the hydraulic damping force. Improvement of the damping force properties until entering the hydraulic damping region, i.e., upon the slight amplitude, slight vibrations and radio frequency, is required.

According to the shock absorber 1 of the embodiment, in the elastic rubber section 291 of the assembled friction member 17, the deepest section 355 of the cutout section 351 formed at the tube section 302 side of the open surface 335 in an opposite direction of the axial direction of the bottom section adhering surface 328 is shallower than the position in the axial direction of the minimum inner diameter section 337 between the diameter expanding sections 338 and 339 of both sides in the axial direction of the inner circumferential side. Accordingly, a compressive force to the piston rod 8 is increased by an extent to which a depth of the cutout section 351 is reduced, and an inclination of an increase in damping force with respect to an increase in piston speed in the dynamic spring region is increased. In addition, until entering the hydraulic damping region, while the minimum inner diameter section 337 configured to generate the highest compressive force is adhered to the piston rod 8, the main section 321 is deformed to rotate about the deepest section 355 by movement of the piston rod 8 as shown by an arrow R of FIG. 5, and thus a region (a stroke) in which a dynamic spring force is generated is increased without sliding with respect to the piston rod 8. Accordingly, the dynamic frictional region is reduced, the properties are varied such that the damping force is smoothly increased with respect to the increase in piston speed and smoothly connected to the hydraulic damping force, and thus good damping force properties can be obtained. Accordingly, in particular, damping force properties upon the slight amplitude, slight vibrations and high frequency can be improved, and the riding comfort and handling stability of a vehicle on which the shock absorber is mounted can be improved. In addition, while a plurality of sets of friction members may be used to increase the inclination of the increase in damping force of the related art, since the inclination of the increase in damping force can be increased by one friction member 17, cost can be reduced in comparison with the case in which the plurality of friction members are assembled, and a basic length can also be reduced. In addition, while the dynamic spring region cannot be substantially increased even when the plurality of friction members are assembled, in the embodiment, the dynamic spring region can be increased. In addition, the plurality of sets of friction members 17 of the embodiment may be used according to requirements of a hydraulic shock absorber.

Figure 9A:
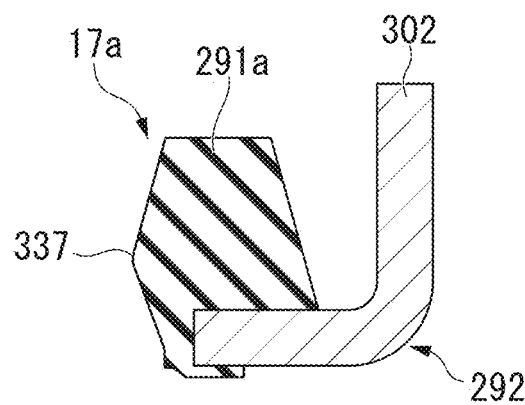
FIG. 9A is one-side cross-sectional view showing another friction member for the purpose of comparison.
Figure 9B:
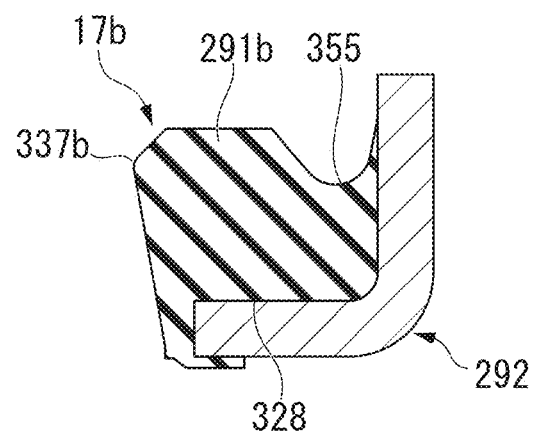
FIG. 9B is one-side cross-sectional view showing another friction member for the purpose of comparison.
Figure 9C:
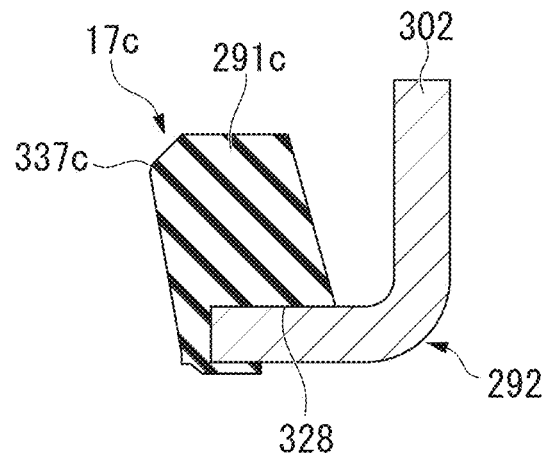
FIG. 9C is one-side cross-sectional view showing another friction member for the purpose of comparison.
Figure 9D:
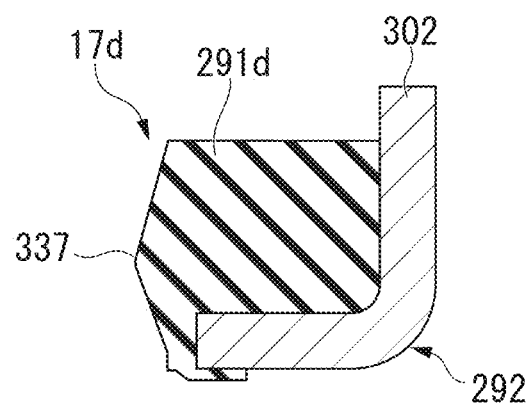
FIG. 9D is one-side cross-sectional view showing another friction member for the purpose of comparison.

Specifically, for cases that the friction member 17 of the shock absorber 1 according to the embodiment and friction members of comparative examples shown in FIGS. 9A to 9D are assembled, properties of the damping force with respect to the piston speed were obtained by experiments. In addition, the comparative example shown in FIG. 9A is a friction member 17*a* (corresponding to a member shown in FIG. 10 of Patent Document 2) having an elastic rubber section 291*a* with a gap with the entire tube section 302 of the base section 292, unlike the embodiment. The comparative example shown in FIG. 9B is a friction member 17*b* having an elastic rubber section 291*b* in which a minimum inner diameter section 337*b* is disposed at an opposite side of the bottom section adhering surface 328 with respect to the deepest section 355, unlike the embodiment. The comparative example shown in FIG. 9C is a friction member 17*c* in which an elastic rubber section 291*c* is installed to have a gap with the entire the tube section 302 of the base section 292 and a minimum inner diameter section 337*c* is deviated at an opposite side of the bottom section adhering surface 328, unlike the embodiment. The comparative example shown in FIG. 9D is a friction member 17d having an elastic rubber section 291d with no gap and no cutout section with the tube section 302 of the base section 292. In addition, the friction member 17d corresponds to the member shown in FIG. 6(D) of Japanese Unexamined Patent Application, First Publication No. 2003-156093.

As a result, as shown by a broken line a1 of FIG. 10, in all of the friction members 17a, 17b and 17c, in the region in which the piston speed is 0 to a very low speed V1, while a spring force by elastic deformation of the elastic rubber section 291 is generated at the dynamic spring region in the frictional region without sliding of the elastic rubber section 291 with respect to the piston rod, since the outer diameter side of the minimum inner diameter section 337 becomes a vacant space, a pressing force is low and an inclination of an increase in damping force with respect to an increase in piston speed is small. After that, a section from V1 to V2 shows properties in the dynamic frictional region of the frictional region in which the elastic rubber section 291 slides with respect to the piston rod to be in the dynamic frictional state, and the damping force is constant. In addition, when the piston speed is V2 or more, it enters the hydraulic damping region, and the damping force by an orifice or a damping valve overlaps the above-mentioned dynamic friction to be dominant. Variation in boundary between the section from V1 to V2 and the hydraulic damping force having the piston speed of V2 or more was increased, and could not be smoothly connected to the hydraulic damping force having the piston speed of V2 or more.

That is, when the elastic rubber section 291a is installed to have a gap with the entire tube section 302 of the base section 292 like the friction member 17a, the elastic rubber section 291a enters the gap upon compression against the piston rod 8 to reduce the stiffness, and the above-mentioned deformation due to rotation cannot easily occur. Accordingly, due to instantly slide with respect to the piston rod 8, the damping force becomes constant. In addition, when the minimum inner diameter section 337b of the elastic rubber section 291b is deviated at an opposite side of the bottom section adhering surface 328 like the friction member 17b, since a portion far from the base section 292 comes in sliding contact with the piston rod 8 with a large compressive force, deformation of the portion having a small stiffness is increased, and the above-mentioned deformation due to rotation cannot easily occur. Accordingly, due to instantly slide with respect to the piston rod 8, the damping force becomes constant.

In addition, in the friction member 17d, the stiffness of the elastic rubber section 291d is increased, and as shown by a chain line d1 of FIG. 10, in the region in which the piston speed is 0 to a very low speed V0, the spring force by the elastic deformation of the elastic rubber section 291 is generated in the dynamic spring region of the frictional region without sliding of the elastic rubber section 291 with respect to the piston rod. Here, while the inclination of the increase in damping force with respect to the increase in piston speed is increased as a force of pressing the elastic rubber section 291d is increased, since there is no vacant space at the outside, deformation due to rotation as described in the embodiment hardly occurs, and sliding instantly occurs (earlier than V1).

After that, in the section from V0 to V2, in the dynamic frictional region of the frictional region, the elastic rubber section 291 slides with respect to the piston rod to be in the dynamic frictional state, and the damping force becomes constant. In addition, when the piston speed is V2 or more, it enters the hydraulic damping region, and the damping force by the orifice or the damping valve overlaps the above-mentioned dynamic friction to become dominant. Variation in boundary between the section from V0 to V2 and the hydraulic damping force having the piston speed of V2 or more was increased, and could not be smoothly connected to the hydraulic damping force having the piston speed of V2 or more.

On the other hand, in the friction member 17 of the embodiment, as shown by a solid line x1 of FIG. 10, in the region in which the piston speed is 0 to a very low speed V2, the spring force by the elastic deformation of the elastic rubber section 291 is generated in the dynamic spring region of the frictional region without sliding of the elastic rubber section 291 with respect to the piston rod. Here, as a force of pressing the elastic rubber section 291 is increased, an inclination of an increase in damping force with respect to an increase in piston speed is increased.

After that, before and after V2, the elastic rubber section 291 slides with respect to the piston rod to be in the dynamic frictional state, and the damping force becomes constant. In addition, when the piston speed is V2 or more, it enters the hydraulic damping region, and the damping force by the orifice or the damping valve overlaps the above-mentioned dynamic friction to become dominant. Accordingly, the piston speed can be smoothly connected to the hydraulic damping force from V0 to V2. As a result, good damping force properties can be obtained, and riding comfort and handling stability of the vehicle on which the shock absorber is mounted can be improved. In addition, when the minimum inner diameter section 337 approaches the bottom section adhering surface 328 too much, stress is increased near the base section 292 and durability is decreased.

Further, in the embodiment, while the example in which there is no dynamic frictional region has been described, the present invention is provided to increase the dynamic spring region, and the dynamic frictional region may be formed according to product specification.

As described above, as will be apparent from the result of the experiment, when the gap is entirely formed between the tube section 302 of the base section 292 and the elastic rubber section, a pressing force is insufficient, and when the entire space between the tube section 302 of the base section 292 and the elastic rubber section is buried, while the pressing force can be increased, since deformation in the rotational direction cannot occur, the dynamic spring region cannot be easily increased.

Here, when the minimum inner diameter section 337b is disposed at an opposite side of the bottom section adhering surface 328 with respect to the deepest section 355, unlike the embodiment, i.e., FIG. 9B, in order to verify why the dynamic spring region cannot be increased, simulation of the stress was performed. The result is shown in FIGS. 11A and 11B.

Figure 11A:
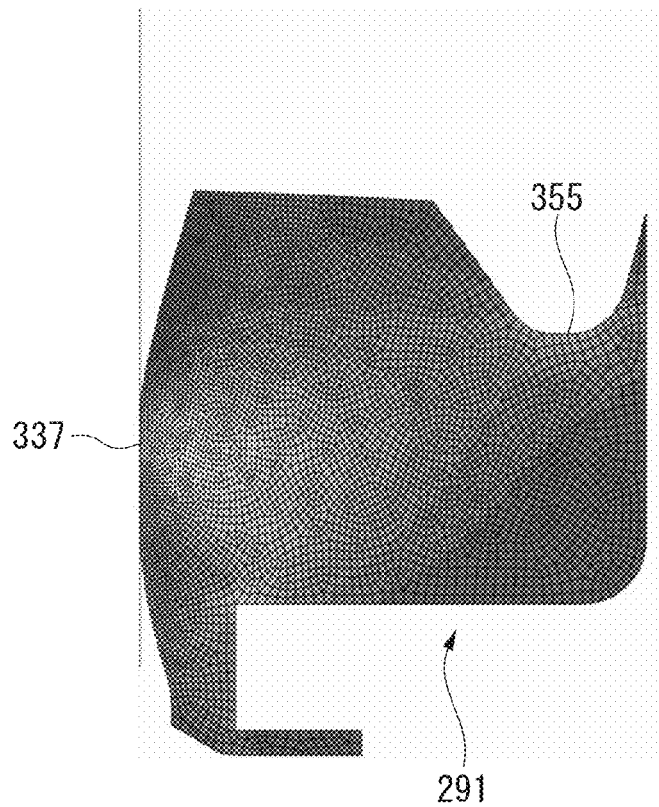
FIG. 11A is a simulation result of the friction member of the shock absorber according to the embodiment of the present invention.
Figure 11B:
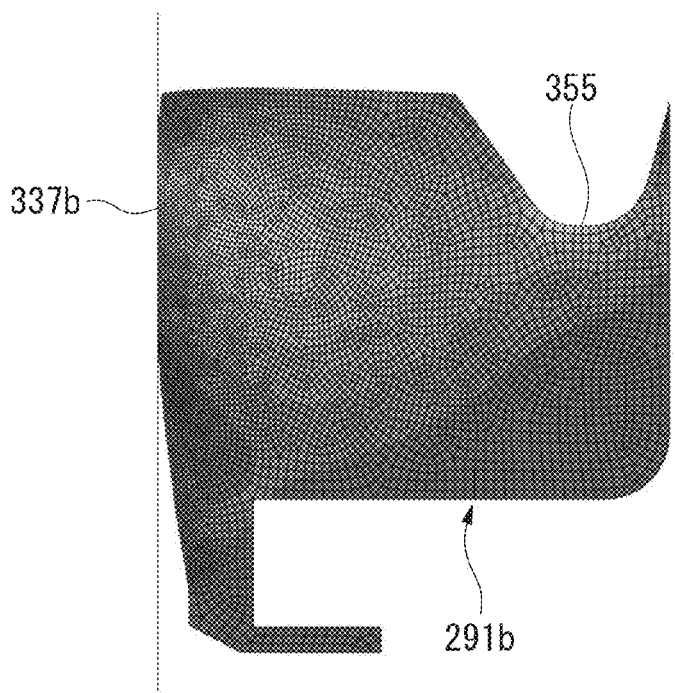
FIG. 11B is a simulation result of a stress distribution of the other friction member.

FIGS. 11A and 11B are simulation results showing stress distribution generated in the elastic rubber section 291 when the friction member comes in sliding contact with the outer circumferential section of the piston rod having $\phi=12.5$ and $\mu=0.3$. Stress is increased as color whitens, and stress is decreased as color darkens. In addition, the present invention is not limited to a numerical dimension and a frictional coefficient. FIG. 11A shows the embodiment, and FIG. 11B shows the comparative example of FIG. 9B.

In the elastic rubber section 291 shown in FIG. 11A, which is the friction member 17 of the embodiment, a white portion is concentrated near the minimum inner diameter section 337 in sliding contact with the piston rod, so that it is assumed that stress concentration occurs. In addition, stress also occurs even in the deepest section 355 and a portion having high stress in comparison with the surrounding thereof is formed obliquely from the vicinity of the minimum inner diameter section 337 to the deepest section 355.

From this, as the piston rod extends, even when the minimum inner diameter section 337 moves upward, since the deepest section 355 approaches a portion having high stress to further increase the stress, a sufficient pressing force is maintained. Accordingly, it is presumed that the elastic rubber section 291 can maintain a static friction state with respect to the piston rod while maintaining the rotational deformation, and as a result, the dynamic spring region was increased.

On the other hand, in the elastic rubber section 291*b* shown in FIG. 11B, the high stress area is concentrated in a leftward and rightward direction of FIG. 11B in a region from a contact portion with the piston rod near the minimum inner diameter section 337*b* to the deepest section 355. Different from FIG. 11A, since the high stress area spreads in a substantially radial direction (the leftward and rightward direction of FIG. 11), when the minimum inner diameter section 337 moves upward as the piston rod extends, since the deepest section 355 goes away from the high stress area, the stress is decreased, a sufficient pressing force cannot be obtained, and the static friction state cannot be maintained. For this reason, it is presumed that the rotational deformation of the elastic rubber section 291 is also reduced, and as a result, the dynamic spring region is insufficiently spread.

Further, from the fact that the contact portion with the piston rod is not quite white and the stress is low, it is presumed that the dynamic spring region is insufficiently spread.

Figure 12:
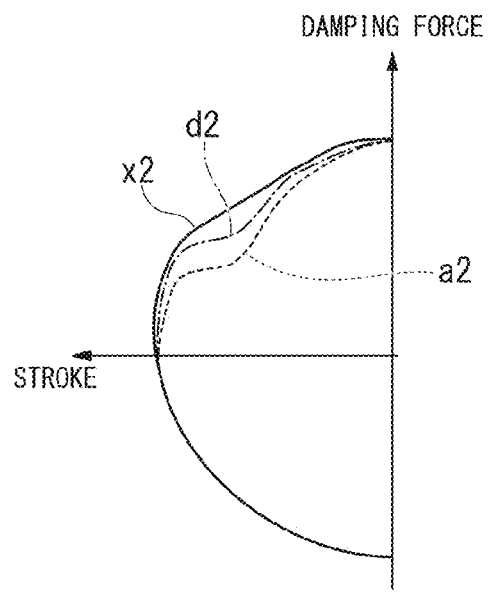
FIG. 12 is an Lissajous waveform showing a relationship between a stroke and a damping force of the shock absorber according to the embodiment of the present invention and the shock absorber using the other friction member.

Reviewing the Lissajous waveform showing the relation between the stroke of the piston rod and the damping force shown in FIG. 12, when either of the friction members 17*a*, 17*b* and 17*c* is used, a large step difference is generated when the damping force is raised, as shown by a broken line a2 of FIG. 12. When and the friction member 17*d* is used, as shown by a chain line d2 of FIG. 12, a slightly reduced step difference occurs. On the other hand, when the friction member 17 of the embodiment is used, as shown by a solid line x2 of FIG. 12, a smooth Lissajous waveform having almost no step difference is shown. In addition, since the damping force is smoothly varied as the Lissajous waveform becomes smooth, it is preferable. If the damping force is not smoothly varied, a passenger may feel a sense of discomfort due to the disturbed area.

Figure 13:
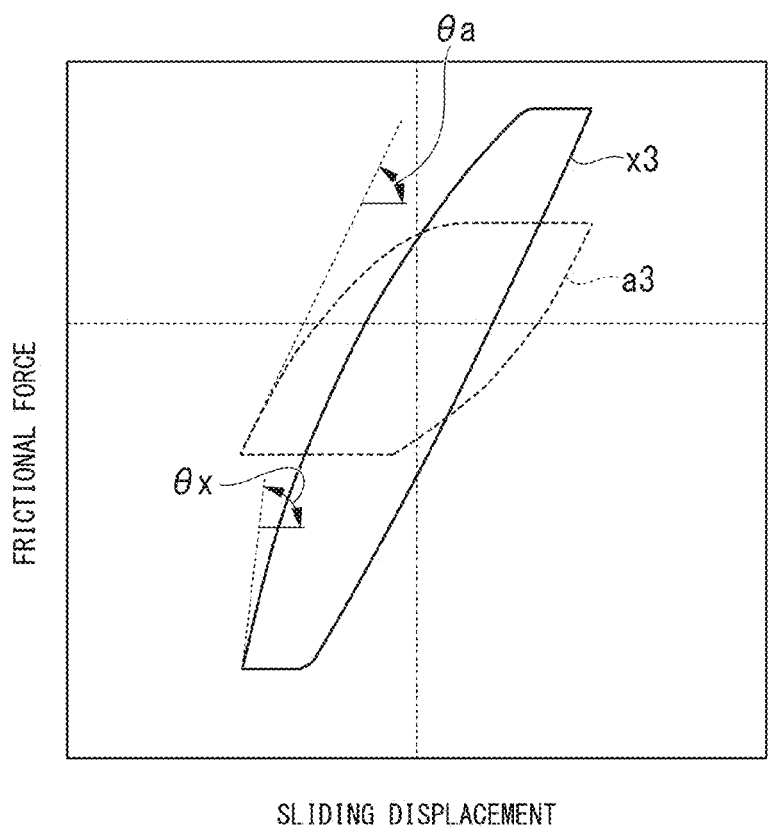
FIG. 13 is a property diagram showing a simulation result of static frictional properties of the friction member of the shock absorber according to the embodiment of the present invention and the other friction member as a relationship of a frictional force with respect to sliding displacement.

FIG. 13 is a simulation result of static frictional properties, showing a relation of a frictional force with respect to sliding displacement. The friction member 17 of the embodiment having properties shown by a solid line x3 of FIG. 13 can obtain large static frictional properties in comparison with the friction members 17*a*, 17*b* and 17*c* having properties shown by a broken line a3 of FIG. 13, and further, the stiffness is increased and an initial inclination θx can be increased in comparison with an inclination θa of the friction members 17*a*, 17*b* and 17*c*.

Figure 14:
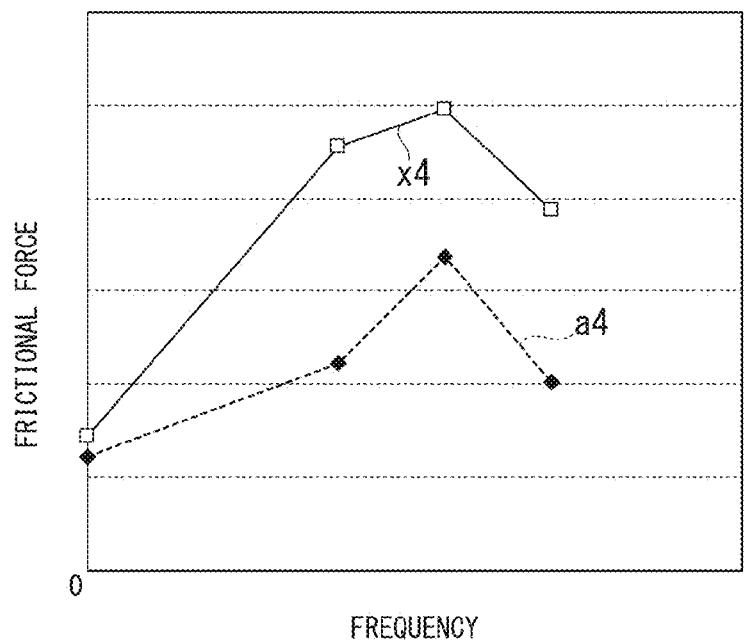
FIG. 14 is a property diagram showing an experiment result of dynamic frictional properties of the friction member of the shock absorber according to the embodiment of the present invention and the other friction member as a relationship of a frictional force with respect to a frequency.

As the stiffness of the friction member 17 is increased, a dynamic spring constant upon a slight amplitude operation of the shock absorber 1 is increased, and improvement of the dynamic frictional properties becomes possible. FIG. 14 is an experiment result of dynamic frictional properties, showing a relation of a frictional force with respect to a frequency. When the friction member 17 of the embodiment having properties shown by a solid line x4 of FIG. 14 has a high frequency in comparison with the friction members 17*a*, 17*b* and 17*c* having properties shown by a broken line a4 of FIG. 14, the frictional force of the dynamic frictional properties can be increased. Accordingly, damping of the slight vibrations of the region in which damping cannot be performed by the hydraulic damping force of the shock absorber 1 can be performed. Accordingly, good damping force properties can be obtained, and riding comfort and handling stability of the vehicle on which the shock absorber is mounted can be improved. In the riding comfort, beginning of running of the vehicle on which the shock absorber is mounted becomes smooth, and cornering feeling caused by abrupt variation in damping force and shaking and rattling feeling transmitted from a road surface to the vehicle body can be reduced.

Figure 15:
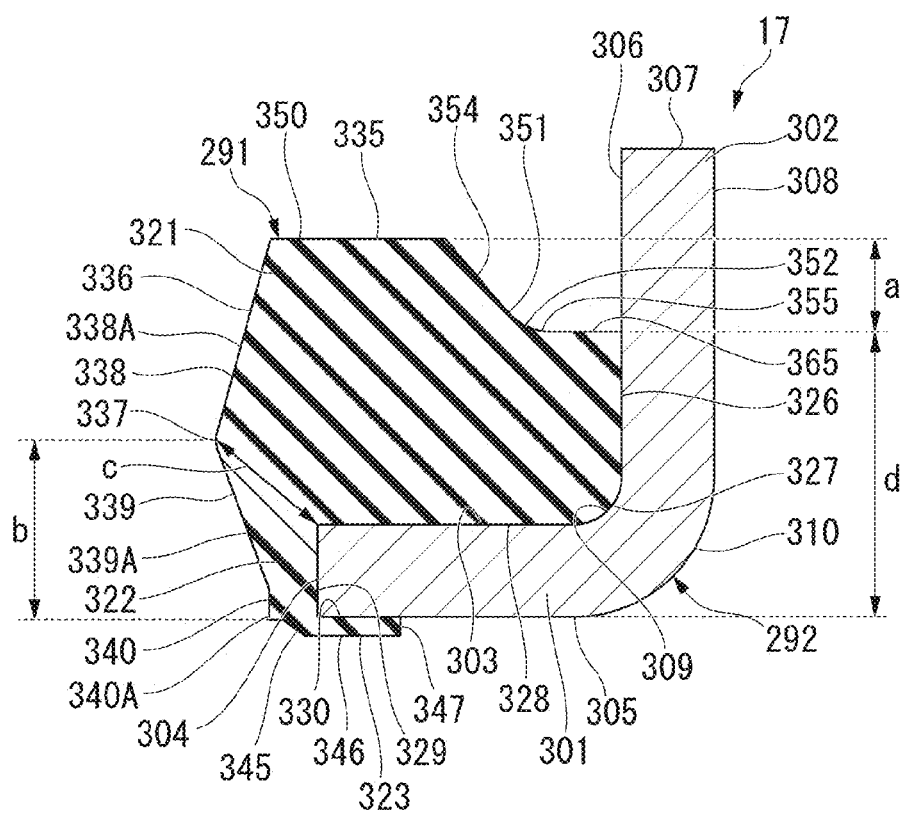
FIG. 15 is one-side cross-sectional view showing a modified example of the friction member of the shock absorber according to the embodiment of the present invention.

Since the elastic rubber section 291 is provided with the extending section 360 disposed at the tube section 302 side of the cutout section 351 and extending to a shallower position in the axial direction than the deepest section 355, manufacturing thereof becomes easy. In addition, as shown in FIG. 15, even when a bottom surface section 365 parallel to the main surface section 350 is formed from the deepest section 355 of the cutout section 351 to the tube section 302 without forming the extending section 360, as described above, the properties of the solid lines x1 to x4 shown in FIGS. 10 and 12 to 14 can be obtained. In addition, the size of the elastic rubber section 291 will be described with reference to FIG. 15. In FIG. 15, a represents 1.0 mm, b represents 1.9 mm, c represents 1.4 mm, and d represents 3.1 mm. It will be apparent from the experiment result that, even when only the length in the axial direction of the main section 321 of the elastic rubber section 291 shown in FIG. 15 is increased, the inclination of the increase in damping force or the damping force properties are substantially equal. In addition, the present invention is not limited to the numerical dimension and frictional coefficient.

In the elastic rubber section 291, since the extension surface of the inner circumferential section 339A of the diameter expanding section 339 of the bottom section adhering surface 328 side and the inward extending surface 354 inside in the radial direction of the cutout section 351 approach each other in the radial direction away from the bottom section adhering surface 328 in the axial direction, even when the elastic rubber section 291 is compressed outward in the radial direction by the piston rod 8, the cutout section 351 can be appropriately maintained and good properties described above can be obtained. That is, when an angle α of the inward extending surface 354 inside in the radial direction of the cutout section 351 is reduced, stiffness of the inner circumferential side is decreased, and when increased, the main section 321 cannot be easily rotated. In order to increase a stroke by compression involving the above-mentioned rotation, the angle α may be larger than an angle β of the inner circumferential surface 339A of the diameter expanding section 339 of the bottom section adhering surface 328 side.

While the stroke until the friction member 17 of the embodiment enters the hydraulic damping region is about ±0.5 mm, as the dynamic spring constant upon such a slight amplitude is improved, various effects such as a smooth start of a steering handle or smooth end of roll upon entering a straight road from an inclined road from a point of view of handling stability, or smooth running from a stopped state, reduction in shaking transmitted from a road surface, or reduction of transmission of road noises into the vehicle from a point of view of a riding comfort can be accomplished. In a luxury car, in particular, the riding comfort, handling stability and quietness in the vehicle become important, and improvement of the damping force properties upon the slight amplitude, i.e., mostly upon the high frequency vibrations or the slight amplitude, provides an absolute effect to the vehicle.

In the above description, while the example in which the cutout section 351 is continuously formed at the entire circumference to be formed in an annular shape has been described, the cutout section may be partially formed to be intermittently disposed at predetermined intervals in the circumferential direction. In this case, three or more arc-shaped cutout sections 351 may be formed at equal intervals.

In addition, the inner circumferential surfaces 338A and 339A of the diameter expanding sections 338 and 339 may have a curved surface shape, rather than the tapered shape. Further, in contrast, the friction member 17 may be installed such that the bottom section 301 of the base section 292 is directed outward in the cylinder inward/outward direction. In addition, the communication passage 361 may be formed to reduce a pressure difference between both sides in the axial direction of the friction member 17, and may have a check valve. A communication groove extending in the axial direction may be formed in the inner circumferential side of the friction member 17, and the communication passage 361 may be constituted by the communication groove and the piston rod 8.

Figure 16:
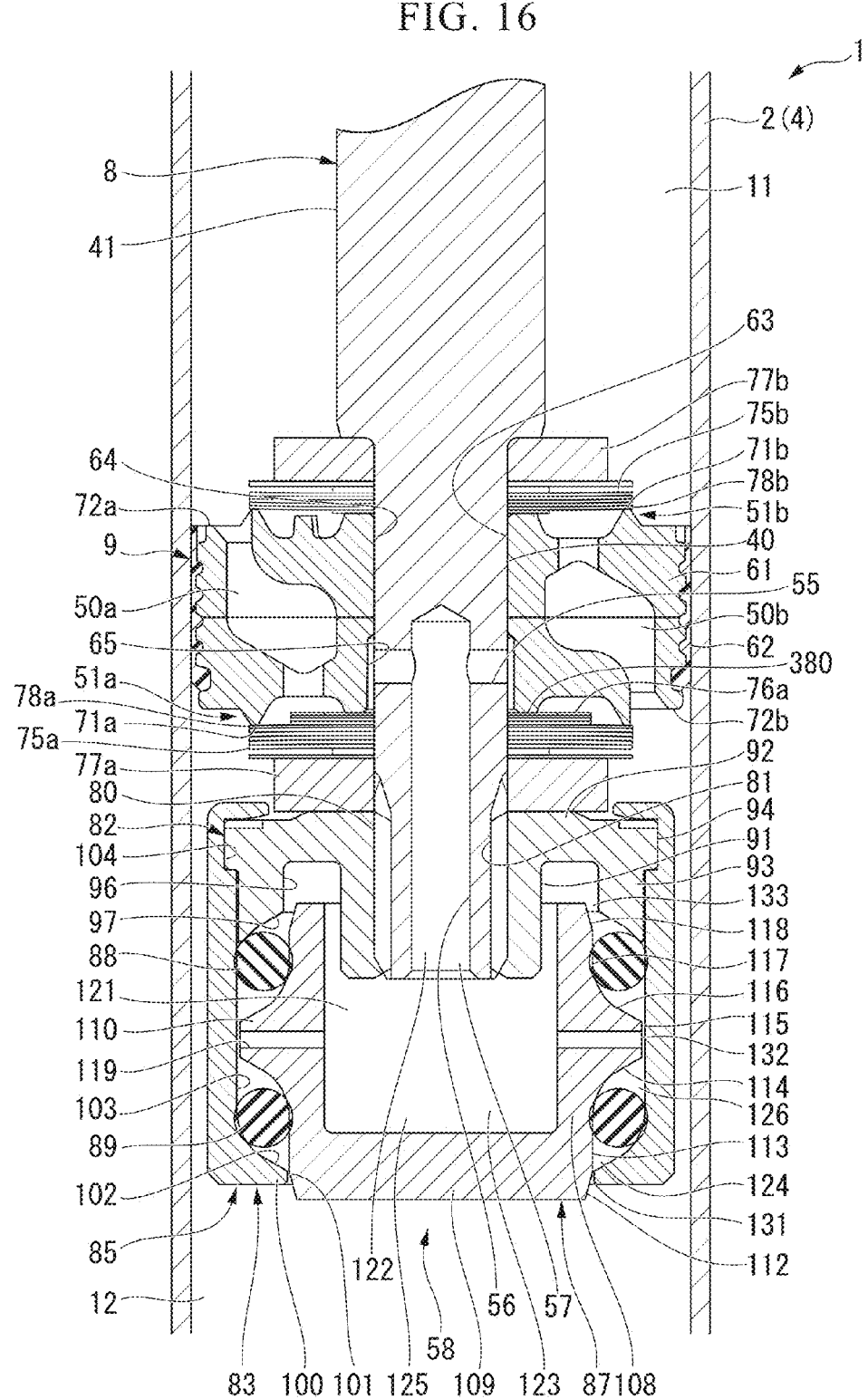
FIG. 16 is an enlarged cross-sectional view showing peripheral parts of a piston of the modified example of the shock absorber according to the embodiment of the present invention.

In the embodiment, the passage hole 55 is formed closer to the chamber 11 in the axial direction than the piston 9 of the piston rod 8, and the passage hole 56 is formed to cross the passage hole 55 to form the rod-inside passage 57. On the other hand, as shown in FIG. 16, the passage hole 55 is formed at a position of the piston 9 of the piston rod 8, and the passage hole 55 is in communication with the large diameter hole section 65 of the insertion hole 63 of the piston 9. Then, a passage groove 380 is formed in the spacer 76a, and the large diameter hole section 65 comes in communication with the passage 50a via the passage groove 380. Accordingly, the chamber 11 is always in communication with the chamber 125 of the damping force varying mechanism 58. According to the above-mentioned configuration, a depth of the passage hole 56 can be reduced, and machining of the passage hole 56 becomes easy.

In addition, in the embodiment, while the example in which the present invention is applied to the dual tube type hydraulic shock absorber has been described, the present invention is not limited thereto but may be applied to a mono-tube type hydraulic shock absorber in which the outer tube is not installed at an outer circumference of the cylinder, or may be applied to any shock absorbers. Further, in the embodiment, while the hydraulic shock absorber is exemplarily described, water or air may be used as a fluid.

The shock absorber of the above-mentioned embodiment includes a cylinder in which a working fluid is hermetically sealed, a piston slidably fitted into the cylinder and configured to partition the inside of the cylinder into two chambers, a piston rod having one end connected to the piston and the other end extending to the outside of the cylinder, a sealing member configured to come in sliding contact with the piston rod and prevent leakage of the working fluid to the outside of the cylinder, a first passage and a second passage configured to flow a working fluid out of one chamber in the cylinder by movement of the piston, a first damping force generation mechanism installed at the first passage and configured to generate a damping force, a housing having at least a partial passage of the second passage formed therein, a free piston movably installed in the housing and configured to partition the second passage into an upstream side and a downstream side, and a spring member disposed in the housing and configured to hold the free piston at a neutral position, wherein the shock absorber has a second damping force generation mechanism including a friction member installed at an inner side of the cylinder with respect to the sealing member and constituted by an annular elastic rubber section in sliding contact with the piston rod and an annular base section to which the elastic rubber section is fixed, and a communication passage configured to reduce a pressure difference between both sides in an axial direction of the friction member. Since the second damping force generation mechanism having the friction member and the communication passage is installed, an acting force to the piston rod upon input of the slight amplitude in which the piston speed is a very low speed can be appropriately adjusted. Accordingly, good damping force properties can be obtained.

In addition, the base section is constituted by a bored disk type bottom section and a tube section extending from an outer circumferential side of the bottom section in the axial direction, a minimum inner diameter section and diameter expanding sections of both sides in the axial direction of the minimum inner diameter section are formed at an inner circumferential side of the elastic rubber section, a tube section adhering surface fixed to the tube section is formed at an outer circumferential side thereof, and a cutout section is at least partially formed at a bottom section adhering surface fixed to the bottom section and the tube section side of an open surface at an opposite side in the axial direction, and a deepest section of the cutout section is shallower than a position in the axial direction of the minimum inner diameter section. Accordingly, a compressive force to the piston rod is increased as a depth of the cutout section is reduced, and an inclination of an increase in damping force with respect to an increase in piston speed at a region of a very low speed is increased. In addition, while the minimum inner diameter section configured to generate the highest compressive force is adhered to the piston rod by movement of the piston rod until entering the hydraulic pressure damping region, deformation by rotation occurs in the elastic rubber section about the deepest section, and thus a region in which a frictional force is generated is spread without sliding with respect to the piston rod. Accordingly, properties are varied such that the damping force is smoothly increased with respect to an increase in piston speed to be smoothly connected to the hydraulic damping force, and good damping force properties can be obtained.

In addition, as a maximum damping force value at an excitation speed of 0.05 m/s is lower at a frequency of 10 Hz or more than at a frequency of 1 Hz or less, and higher than at a frequency of about 5 Hz, good damping force properties can be obtained upon input of slight amplitude in which the piston speed is a very low speed.

Further, the shock absorber is used in a vehicle body including run flat tires, in which riding comfort is deteriorated as vibrations of unsprung mass in which stiffness (a spring constant) of a tire is increased, and an effect of improving damping properties under spring is increased.

In addition, the shock absorber is used in a vehicle body including tires having a pneumatic pressure of 240 kPa or more, in which riding comfort is deteriorated as vibrations of unsprung mass in which stiffness (a spring constant) of a tire is increased, and an effect of improving damping properties under spring is increased.

Hereinabove, while exemplary embodiments of the present invention have been described, the present invention is not limited thereto. Addition, omission, substitution and other modifications of components may be made without departing from the scope of the present invention. The present invention is not limited to the above-mentioned description but is limited only by the accompanying claims.

What is claimed is:
1. A shock absorber comprising:
a cylinder in which a working fluid is sealed therein;
a piston slidably fitted into the cylinder and configured to partition an inside of the cylinder into two chambers;
a piston rod having one end connected to the piston and the other end extending to an outside of the cylinder;

a sealing member configured to come in sliding contact with the piston rod and prevent leakage of the working fluid to the outside of the cylinder;

a first passage and a second passage configured to flow the working fluid out of one chamber in the cylinder by movement of the piston;

a first damping force generation mechanism installed at the first passage and configured to generate a damping force;

a housing having at least a partial passage of the second passage formed therein;

a free piston movably installed in the housing and configured to partition the second passage into an upstream side and a downstream side; and a spring member disposed in the housing and configured to hold the free piston at a neutral position, wherein the shock absorber has a second damping force generation mechanism comprising:

a friction member installed at an inner side of the cylinder with respect to the sealing member and constituted by an annular elastic rubber section in sliding contact with the piston rod and an annular base section to which the elastic rubber section is fixed;

a communication passage configured to reduce a pressure difference between both sides in an axial direction of the friction member; and wherein the free piston includes an interior chamber, and wherein the second passage allows fluid within the interior chamber of the free piston to communicate with the one chamber of the cylinder.

2. The shock absorber according to claim 1, wherein the base section is constituted by a bored disk type bottom section and a tube section extending from an outer circumferential side of the bottom section in the axial direction, a minimum inner diameter section and diameter expanding sections of both sides in the axial direction of the minimum inner diameter section are formed at an inner circumferential side of the elastic rubber section, a tube section adhering surface fixed to the tube section is formed at an outer circumferential side thereof: and a cutout section is at least partially formed at a bottom section adhering surface fixed to the bottom section and the tube section side of an open surface at an opposite side in the axial direction, and a deepest section of the cutout section is shallower than a position in the axial direction of the minimum inner diameter section.

3. The shock absorber according to claim 1, wherein a maximum damping force value at an excitation speed of 0.05 m/s is lower at a frequency of 10 Hz or more than at a frequency of 1 Hz or less, and higher than at a frequency of about 5 Hz.

4. The shock absorber according to claim 2, wherein a maximum damping force value at an excitation speed of 0.05 m/s is lower at a frequency of 10 Hz or more than at a frequency of 1 Hz or less, and higher than at a frequency of about 5 Hz.

5. A vehicle in which the shock absorber according to claim 1 is used in a vehicle body comprising run flat tires.

6. A vehicle in which the shock absorber according to claim 2 is used in a vehicle body comprising run flat tires.

7. A vehicle in which the shock absorber according to claim 3 is used in a vehicle body comprising run flat tires.

8. A vehicle in which the shock absorber according to claim 4 is used in a vehicle body comprising run flat tires.

9. A vehicle in which the shock absorber according to claim 1 is used in a vehicle body comprising tires having a pneumatic pressure of 240 kPa or more.

10. A vehicle in which the shock absorber according to claim 2 is used in a vehicle body comprising tires having a pneumatic pressure of 240 kPa or more.

11. A vehicle in which the shock absorber according to claim 3 is used in a vehicle body comprising tires having a pneumatic pressure of 240 kPa or more.

12. A vehicle in which the shock absorber according to claim 4 is used in a vehicle body comprising tires having a pneumatic pressure of 240 kPa or more.

13. The shock absorber according to claim 1, wherein the second passage does not permit communication between the two chambers of the cylinder.

14. The shock absorber of claim 1, wherein the housing, free piston and spring member are configured to reduce a damping force of the shock absorber when the movement speed of the piston is approximately 0.1 m/s or less and the movement frequency is approximately 5 Hz or greater.

15. The shock absorber of claim 14, wherein the second damping force generation mechanism is configured to increase a damping force of the shock absorber when the movement frequency is approximately 10 Hz or greater, and the amplitude of movement is 0.2 mm or less.

* * * * *